United States Patent
Dutta et al.

(10) Patent No.: US 10,224,849 B2
(45) Date of Patent: Mar. 5, 2019

(54) SYSTEM AND METHOD FOR AN INVERTER FOR SELF-EXCITATION OF AN INDUCTION MACHINE

(71) Applicant: Deere & Company, Moline, IL (US)

(72) Inventors: Sumit Dutta, Fargo, ND (US); Lav Thyagarajan, West Fargo, ND (US); Long Wu, Fargo, ND (US); Kent D. Wanner, Fargo, ND (US)

(73) Assignee: DEERE & COMPANY, Moline, IL (US)

( * ) Notice: Subject to any disclaimer, the term of this patent is extended or adjusted under 35 U.S.C. 154(b) by 70 days.

(21) Appl. No.: 15/406,639

(22) Filed: Jan. 13, 2017

(65) Prior Publication Data
US 2017/0353135 A1 Dec. 7, 2017

Related U.S. Application Data

(60) Provisional application No. 62/346,114, filed on Jun. 6, 2016.

(51) Int. Cl.
| | |
|---|---|
| H02P 9/36 | (2006.01) |
| H02P 9/38 | (2006.01) |
| H02P 9/08 | (2006.01) |
| H02P 21/09 | (2016.01) |

(52) U.S. Cl.
CPC .................. *H02P 9/36* (2013.01); *H02P 9/08* (2013.01); *H02P 9/38* (2013.01); *H02P 21/09* (2016.02)

(58) Field of Classification Search
CPC .. H02P 21/13; H02P 2205/01; H02P 29/0241; H02P 9/30; H02P 9/36; H02P 9/38

USPC .... 318/400.02, 400.05, 400.22, 400.26, 722, 318/504, 515, 516
See application file for complete search history.

(56) References Cited

U.S. PATENT DOCUMENTS

| | | | |
|---|---|---|---|
| 4,023,083 A | 5/1977 | Plunkett | |
| 5,739,664 A * | 4/1998 | Deng | B60L 15/025 |
| | | | 318/599 |

(Continued)

FOREIGN PATENT DOCUMENTS

JP   2008061491 A   3/2008

OTHER PUBLICATIONS

European Search Report issued in counterpart application No. 17169808.7 dated Nov. 14, 2017. (7 pages).

(Continued)

*Primary Examiner* — Thai Dinh

(57) ABSTRACT

A voltage difference is determined between the observed voltage and a reference direct current bus voltage. A quadrature-axis (q-axis) voltage command is outputted based on a current difference derived from the voltage difference. A commanded direct-axis (d-axis) voltage is determined based on a measured d-axis current and a determined d-axis reference current derived from a mathematical relationship between d-axis residual voltage, the observed voltage and the commanded q-axis voltage, where residual voltage is proportional to a function of the observed voltage and the commanded q-axis voltage. An inverse Parks transformation module or a data processor provides one or more phase voltage command based on inverse Parks transform of the commanded voltages.

14 Claims, 14 Drawing Sheets

(56) References Cited

U.S. PATENT DOCUMENTS

| | | | | |
|---|---|---|---|---|
| 6,163,127 | A * | 12/2000 | Patel | B60L 11/1803 318/700 |
| 6,163,128 | A * | 12/2000 | Hiti | B60L 11/1803 318/433 |
| 6,965,212 | B1 * | 11/2005 | Wang | H02P 21/06 318/700 |
| 7,109,605 | B2 | 9/2006 | Habu | |
| 7,164,253 | B2 | 1/2007 | Sato et al. | |
| 8,310,197 | B2 | 11/2012 | Chen et al. | |
| 8,604,735 | B2 * | 12/2013 | Filka | H02P 21/0089 318/432 |
| 8,648,562 | B2 | 2/2014 | Lipo | |
| 8,810,189 | B2 | 8/2014 | Singh et al. | |
| 8,853,991 | B2 | 10/2014 | Shan et al. | |
| 8,853,992 | B2 | 10/2014 | Boom | |
| 9,762,164 | B2 * | 9/2017 | Campbell | H02P 21/12 |
| 9,797,406 | B2 * | 10/2017 | Ishikawa | F04D 27/004 |
| 9,825,564 | B2 * | 11/2017 | Magee | H02P 6/183 |
| 2006/0043923 | A1 * | 3/2006 | Baker | H02P 21/06 318/807 |
| 2008/0129238 | A1 | 6/2008 | Andersen | |
| 2009/0121669 | A1 | 5/2009 | Hanada | |
| 2012/0239319 | A1 | 9/2012 | Singh | |
| 2014/0265952 | A1 * | 9/2014 | Katariya | H02P 21/0003 318/400.02 |
| 2017/0353134 | A1 | 12/2017 | Dutta et al. | |

OTHER PUBLICATIONS

S. Hazra et al, vector approach for self-excitation and control of induction machine in stand-alone wind power generation, IET Renewable Power Generation, dated Jan. 1, 2011, p. 397, vol. 5, No. 5, Michael Faraday House, Six Hills Way, Stevenage, Herts. SGI 2AY, UK.

Basic Mateo et al, Vector control system of a self-excited induction generator including iron losses and magnetic saturation, Control Engineering Practice, Pergamon Press, Oxford GB, dated Jan. 18, 2013, p. 395-406, vol. 21 , No. 4.

European Search Report issued in counterpart application No. 17174512.8 dated Nov. 17, 2017. (7 pages).

Seyoum, D.; Rahman, M.F.; and Grantham, C. "Terminal Voltage Control of a Wind Turbine Driven Isolated Induction Generator Using Stator Oriented Field Control." The 18th Annual Institute of Electrical and Electronics Engineers, Applied Power Electronics Conference and Exposition, vol. 2, pp. 846-852 [online], Feb. 9, 2003 [retrieved Jul. 6, 2016]. Retrieved from the Internet< URL:http://ieeexplore.ieee.org/stamp/stamp.jsp?tp=&arnumber=1179315>.

Premalatha, K., and Sudan, S. "Self-Excitation and Voltage Control of an Induction Generator in an Independent Wind Energy Conversion System." International Journal of Modern Engineering Research, vol. 2, No. 2, pp. 454-461, [online], Mar.-Apr. 2012 [retrieved Jul. 6, 2016]. Retrieved from the Internet:<URL: http://www.ijmer.com/papers/vol2_issue2/CC22454461.pdf>.

Sivakami, P.; Karthigaivel, R.; and Selvakumaran, S. "Voltage Control of Variable Speed Induction Generator Using PWM Converter." International Journal of Engineering and Advanced Technology, vol. 2, No. 5, pp. 30-35 [online], Jun. 2013 [retrieved Jul. 6, 2016]. Retrieved from the Internet:< URL:http://citeseerx.ist.psu.edu/viewdoc/download?doi=10.1.1.673.8077&rep=rep1&type=pdf>.

* cited by examiner

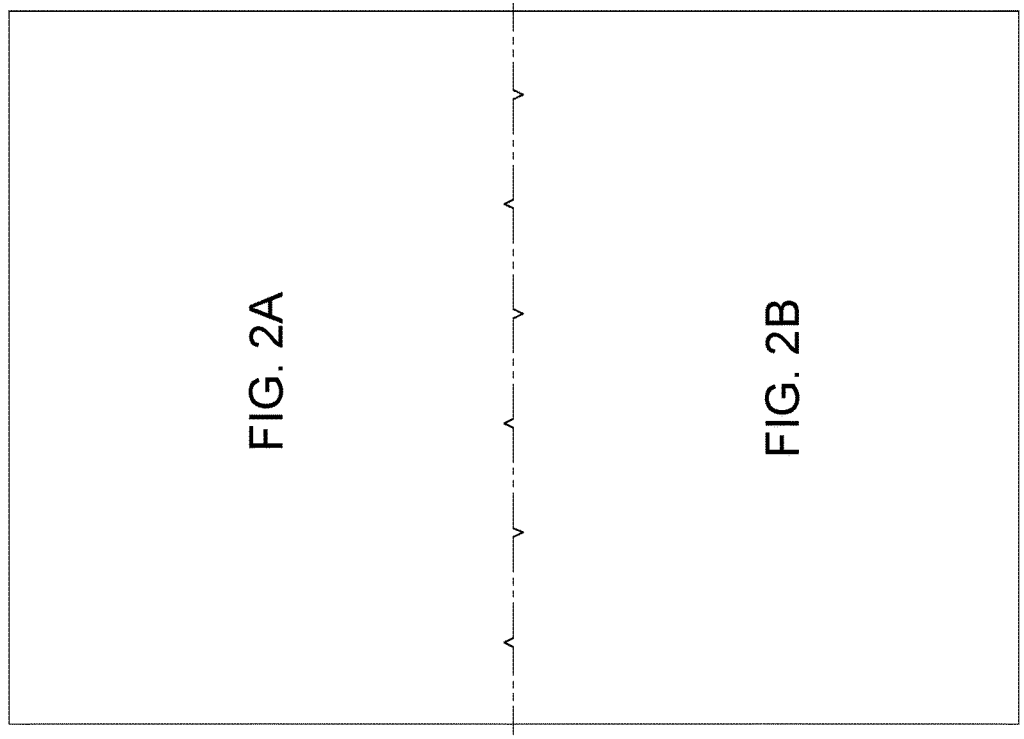

SYSTEM AND METHOD FOR AN INVERTER FOR SELF-EXCITATION OF AN INDUCTION MACHINE

RELATED APPLICATION

This document (including the drawings) claims priority based on U.S. provisional application Ser. No. 62/346,114, filed on Jun. 6, 2016 under 35 U.S.C. 119(e), which is hereby incorporated by reference into this document.

FIELD

This disclosure relates to a system and method for a self-exciting of an induction machine, and more particularly for a self-exciting an induction generator (e.g., three-phase, squirrel-cage induction machine).

BACKGROUND

In certain prior art, the windings of an induction generator can be excited by various schemes. Under a first scheme, a battery is connected across the direct current bus of an inverter to excite one or more windings of an induction generator. Under a second scheme, a bank of capacitors is connected to one or more windings of the phases of the induction generator to excite one or more windings of the induction generator. However, both the first scheme and the second scheme require additional components beyond the driver circuit for the inverter switches. Further, a bank of capacitors can increase the volume, size and/or weight of an inverter and induction generator. Any unnecessary increase in the weight of the inverter and induction generator tends to reduce fuel efficiency of a vehicle that incorporates the inverter. For the above reasons, there is a need for an improved system and method for an inverter for self-excitation of an induction machine.

SUMMARY

In accordance with one embodiment, a method for controlling an inverter measures an observed voltage across direct current voltage terminals of associated with the inverter. A data processor, summer or voltage difference module determines a voltage difference between the observed voltage and a reference DC bus voltage. A first current regulator or data processor outputs a quadrature-axis (q-axis) voltage command based on a current difference derived from the voltage difference. A second current regulator or data processor determines a commanded direct-axis (d-axis) voltage based on a measured d-axis current and a determined d-axis reference current derived from a mathematical relationship between d-axis residual voltage, the observed voltage and the commanded q-axis voltage, where residual voltage is proportional to a function of the observed voltage and the commanded q-axis voltage. An inverse Parks transformation module or a data processor provides one or more phase voltage commands based on inverse Parks transform of the commanded voltages.

BRIEF DESCRIPTION OF THE DRAWINGS

FIG. 2, which is collectively

DETAILED DESCRIPTION

Figure 1:
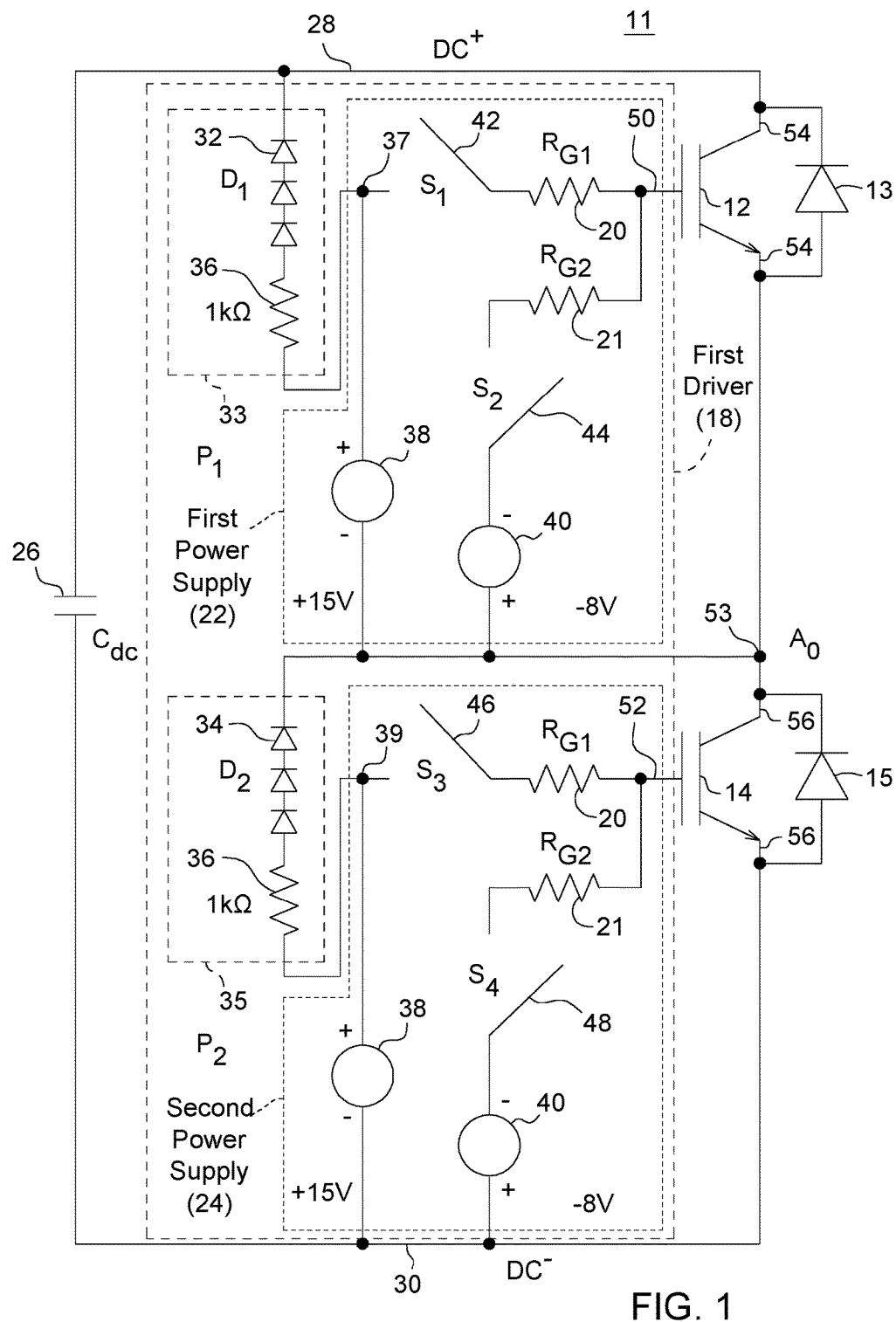
FIG. 1 is one embodiment of a schematic representation of a first phase of an inverter and an associated driver for a self-exciting of an induction machine.

FIG. 1 is one embodiment of a schematic representation of a single phase or first phase of an inverter system 11 and an associated first phase driver 18. In accordance with one embodiment, an inverter system 11 comprises a pair of direct current voltage terminals (28, 30) (e.g., direct current voltage bus) of opposite polarity. A capacitor 26 ($C_{DC}$) is connected between the direct current voltage terminals (28, 30). Each phase of the inverter includes a pair of switches, such as a first switch 12 ($A_1$) and a second switch 14 ($A_2$). A first switch 12 ($A_1$) has first switched terminals 54 and a first control terminal 50. A second switch 14 ($A_2$) has second switched terminals 56 and a second control terminal 52. The switched terminals (54, 56) of the first switch 12 and the second switch 14 are coupled in series, at the first phase output terminal 53, between the direct current voltage terminals (28, 30) (e.g., DC+ and DC− terminals in FIG. 1). In this document, the direct current voltage terminals (28, 30) shall be synonymous with the direct current bus.

In one embodiment, if the first switch 12 comprises a transistor, such as a bipolar junction transistor or insulated gate bipolar junction transistor (IGBT), the first switched terminals 54 comprise an emitter and a collector. The first control terminal 50 of the first switch 12 may comprise a gate or a base of the first switch 12. In one embodiment, if the first switch 12 comprises a field-effect transistor, the first switched terminals 54 comprise a source and a drain. The first control terminal 50 of the first switch 12 may comprise a gate or a base.

Similarly, in one embodiment, if the second switch 14 comprises a transistor, such as a bipolar junction transistor or an insulated gate bipolar junction transistor (IGBT), the second switched terminals 56 comprise an emitter and a collector. The second control terminal 52 of the second switch 14 may comprise a gate or a base of the second switch 14. In one embodiment, if the second switch 14 comprises a field-effect transistor, the second switched terminals 56 comprise a source and a drain. The second control terminal 52 of the second switch 14 may comprise a gate or a base of the second switch 14.

A protection diode or free-wheeling diode (13, 15) may be connected between the switched terminals (54, 56) of each switch to protect the switch from transient currents that occur during switching transitions of the first switch 12 and the second switch 14. For example, the first protection diode 13 may conduct to dissipate transient energy associated with an electrical energy spike when the first switch 12 is switched off and the inductive motor winding, motor or induction machine 55 induces the energy spike. Similarly, the second protection diode 15 may conduct to dissipate transient energy associated with an electrical energy spike when the second switch 14 is switched off and the inductive motor winding or motor induces the energy spike.

Figure 2A:
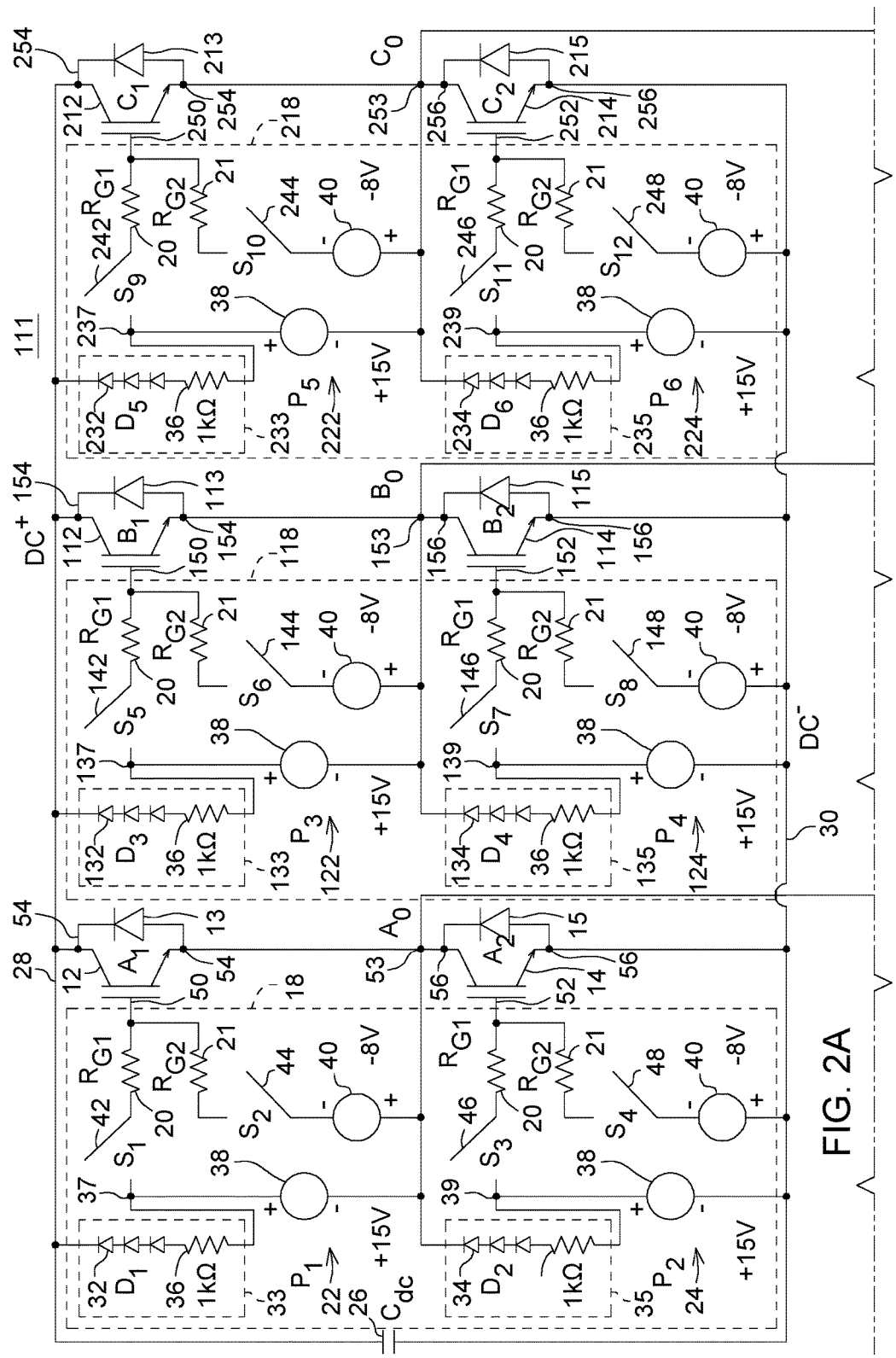
FIG. 2A and FIG. 2B, is one embodiment of a schematic representation of an inverter system with three phases that are connected to an induction machine or generator, where the inverter system is arranged to self-excite an induction machine.
Figure 2B:
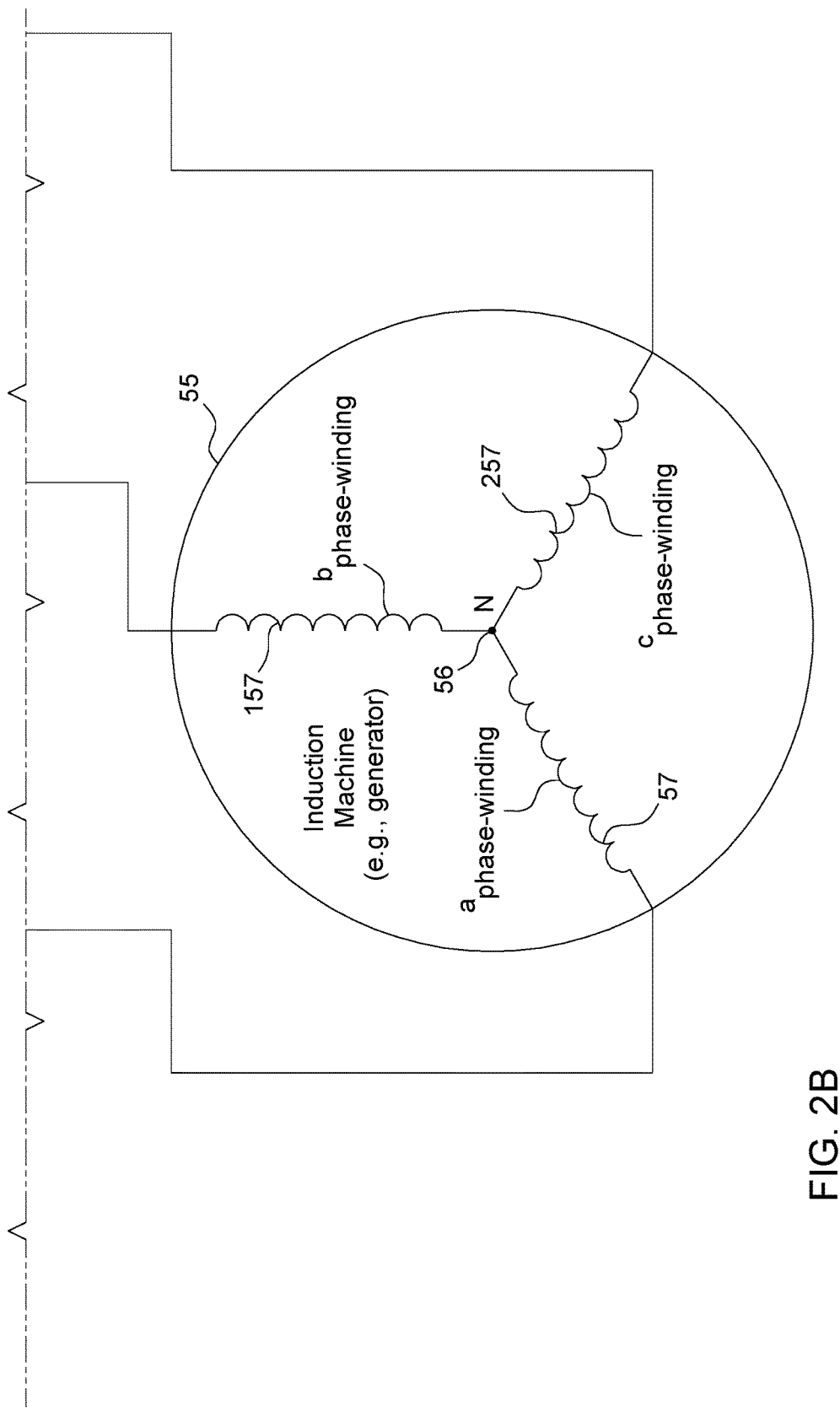

An electric machine 55 (in FIG. 2) or generator has one or more windings (57, 157, 257 in FIG. 2). With respect to FIG. 1, a first phase output terminal 53 is associated with the switched terminals (54, 56) between the first switch 12 and the second switch 14 and the first phase output 53 terminal can be coupled or connected to a winding (e.g., phase winding) of the electric machine 55.

A first phase driver 18 (e.g., first driver) comprises a first power supply 22 and a second power supply 24 that are controlled by, modulated by, or switched by a driver controller or an electronic data processing system 100 (e.g., that uses the control switches (S1, S2, S3 and S4). In one embodiment, the first power supply 22 comprises a first voltage source 38 and a second voltage source 40. In another embodiment, the second power supply 24 comprises a first voltage source 38 and a second voltage source 40. In certain embodiments, neither the first power supply 22, nor the second power supply 24 is capable of providing enough current to establish directly the requisite electromagnetic flux or adequate excitation in the induction machine 55, such that in a start-up mode a trickle charging technique is used to establish the electromagnetic flux or adequate excitation in the induction machine 55 for entry into the transitional excitation mode. The trickle charge refers to a slow or gradual charging over time of the direct current capacitor 26 or the direct current bus at a lower current level than a threshold current level, such as the threshold current necessary to establish to establish immediately and directly the electromagnetic flux or adequate target excitation voltage in the induction machine 55 (e.g., that would be characteristic of an operational mode). That is, the trickle charge prepares the inverter system 11 for entry into the transitional excitation mode as an intermediate preparation for the operational mode.

In one embodiment, the first phase driver 18 comprises a first biasing network 33; the first biasing network 33 comprises a first set of blocking diodes 32 are cascaded in series between one of the direct current terminals (28) and a node 37 associated with the first power supply 22 and a first control switch 42 of the first phase driver 18. In one embodiment, the first phase driver 18 comprises a second biasing network 35; the second biasing network 35 comprises a second set of blocking diodes 34 that are cascaded in series between the first phase output terminal 53 and a node 39 associated with the second power supply 24 and a third control switch 46 of the first phase driver 18.

In one configuration, a first power supply 22 provides a first output voltage level (e.g., positive 15 volts direct current (VDC)) and a second output level (e.g., negative 8 volts direct current (VDC)) switchable (via control switches (42, 44)) to the first control terminal 50, where the first output level is distinct from the second output level. Similarly, a second power supply 24 provides the first output voltage level and the second output level switchable (via control switches (46, 48)) to the second control terminal 52.

In one embodiment, the first power supply 22 is associated with a first control switch 42 ($S_1$) between the first control terminal 50 and the first output voltage level at node 37; the first power supply 22 is associated with a second control switch 44 ($S_2$) between the first control terminal 50 and a node at the second output level. One or more resistors may be associated with the first control terminal 50. For example, a first input resistor 20 (e.g., gate resistor, $R_{G1}$) is coupled between the first control terminal 50 and a terminal of the first control switch 42, and a second input resistor 21 (e.g., gate resistor, $R_{G2}$) is coupled between the first control terminal 50 and a terminal of the second control switch 44. In practice, the second control switch 44 can be turned on to hold or bias (e.g., by maintaining a negative gate-to-source voltage or appropriate bias voltage as required based upon the semiconductor configuration or doping of the first switch) the first switch 12 in an off mode.

Similarly, the second power supply 24 is associated with a third control switch 46 ($S_3$) between the second control terminal 52 and the first output voltage level at node 39 and a fourth control switch 48 ($S_4$) between the second control terminal 52 and a node at the second output level. One or more resistors may be associated with the second control terminal 52. For example, a first input resistor 20 (e.g., gate resistor, $R_{G1}$) is coupled between the second control terminal 52 and a terminal of the third control switch 46, and a second input resistor 21 (e.g., gate resistor, $R_{G2}$) is coupled between the second control terminal 52 and a terminal of the fourth control switch 48.

Figure 6A:
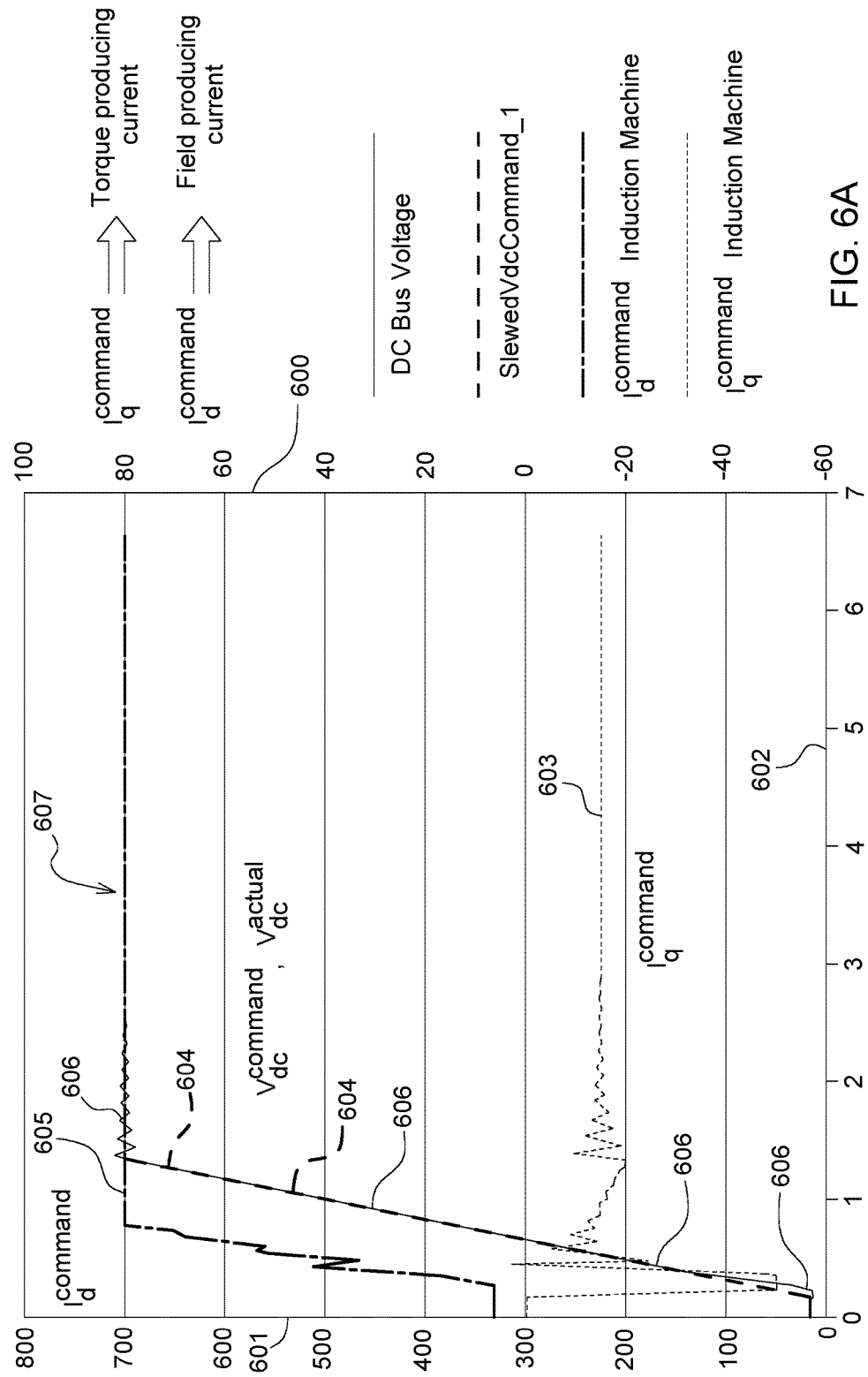
FIG. 6A is an illustrative chart that represents one possible waveform in the ramping up of the excitation voltage in the capacitor versus time during the start-up mode, transitional excitation mode and reaching or approaching full target excitation voltage in the operational mode, among other things.
Figure 6B:
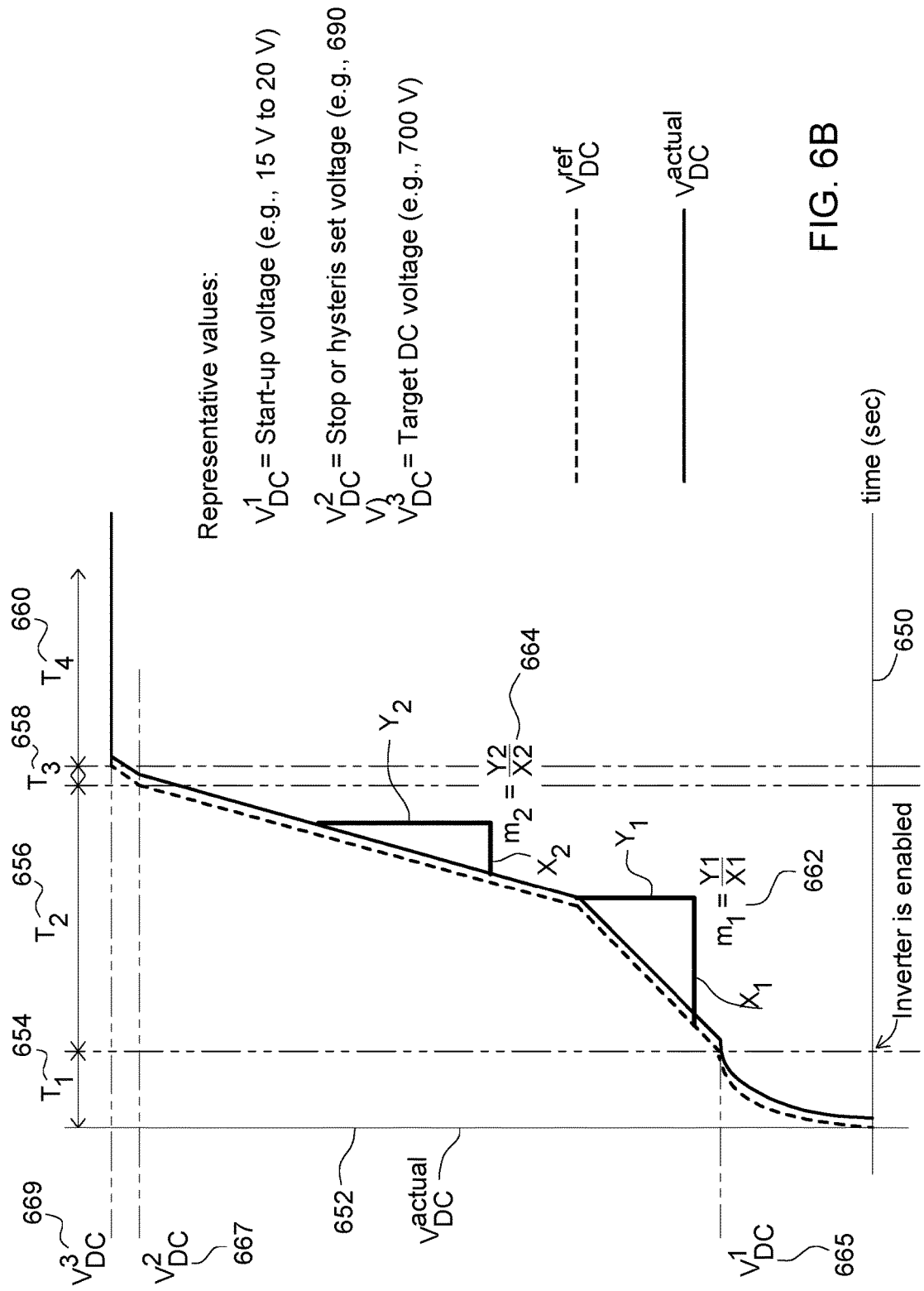
FIG. 6B is an illustrative chart that represents another possible waveform in the ramping up of the excitation voltage in the capacitor versus time during the start-up mode, transitional excitation mode and reaching or approaching full target excitation voltage in the operational mode, among other things.

FIG. 6A and FIG. 6B show illustrative examples of waveforms in the ramping up or increasing of the excitation direct current voltage in the capacitor (e.g., 26) versus time (or across the DC bus terminals (28, 30)) during the start-up mode and the transitional excitation mode. The direct current voltage in the capacitor (e.g., 26) reaches or approaches full target excitation voltage in the operational mode.

As used in this document, a start-up mode (e.g., weak pre-charge mode) shall mean a mode in which there is no switching (permitted) of the inverter switches (e.g., 12, 14 in FIG. 1 or 12, 14, 112, 114, 212, 214 in FIG. 2) and the capacitor is charging or charged (e.g., trickle charged) to an initial start-up voltage (level), a preliminary voltage, initial voltage level or an energy level that is: (1) sufficient to enable the inverter switches (e.g., 12, 14 in FIG. 1 or 12, 14, 112, 114, 212, 214 in FIG. 2) to begin to operate, (2) greater than or equal to a minimum operational threshold direct current (DC) voltage, (3) supportive of a transitional excitation mode to increase or ramp up the direct current bus voltage from the initial start-up voltage to a target direct current operational voltage or in accordance with self-excitation of the induction machine (e.g., 55) by the electromagnetic fields induced by the moving rotor of the induction machine (e.g., 55). For instance, the rotor of the induction machine 55 may be moved by rotational energy applied from an internal combustion engine, a wind turbine, a hydroelectric turbine, a wind rotor blade, a vehicle wheel, or another rotational energy source to induce or self-excite electrical energy in one or more windings of the induction machine 55.

A transitional excitation mode can occur in a time period after the start-up mode and prior to the operational mode. The transitional excitation mode is mode in which switching of the inverter switches (e.g., 12, 14 in FIG. 1) can occur (e.g., consistent with increase in the direct current voltage). In practice, the transitional excitation mode between the minimum operational threshold direct current voltage and the target operational threshold direct current voltage may be characterized by one or more generally linear slopes, or curved slopes, that increase from the minimum operational threshold direct current to the target operational threshold direct current voltage.

An operational mode shall mean a generating mode in which the induction machine or induction generator can or is generating electrical energy in response to the application of rotational energy from a rotational energy source.

A transitional excitation mode shall mean one or more of the following: (1) a mode in a time window that occurs after the start-up mode and prior the operational mode, or (2) a mode after the start-up mode and during an initial time period of the operational mode while the alternating current, or associated voltage output, produced by the induction machine in a generating mode is increasing or ramping up to a target operating voltage output (e.g., root mean squared voltage output or DC link voltage). The target operating voltage output may be observed at the direct current terminals of the inverter that is coupled to the induction machine to convert the alternating current output of the induction machine to a direct current output in the generating mode. In one embodiment, the self-excitation process (e.g., in which the induction machine generates sustainable electrical energy to overcome losses in the induction machine and inverter) occurs during the transitional excitation mode, which is prior to or during the operational mode. For example, the transitional excitation mode includes a time period, between the minimum operational threshold direct current voltage and the target operational threshold direct current voltage, when the inverter switches can operate (e.g., at less than peak alternating current output voltage) based solely on excitation following the start-up mode.

In a start-up mode (e.g., prior to the transitional excitation mode or self-excitation process), the first power supply 22 and the second power supply 24 simultaneously each provide electrical energy at the first voltage level (e.g., approximately positive 15 volts direct current (VDC)) in series via the first set of blocking diodes 32 and the second set of blocking diodes 34 to the capacitor 26 ($C_{DC}$) to trickle charge the capacitor 26 to initiate the self-excitation of alternating current flux in one or more windings (e.g., of the induction machine 55) associated with the first phase output terminal 53. Collectively, the voltage applied to trickle charge the capacitor 26 is approximately twice the first voltage level, less voltage drops in the forward biased diodes of the first set of blocking diodes 32 and the second set of blocking diodes 34 and less voltage drop in any resistors 36.

In an operational mode (e.g., or in the transitional excitation mode) after charging the capacitor 26, the first output level can be applied to the activate the first switch 12 or the second switch 14, whereas the second level can be applied to deactivate the first switch 12 or the second switch 14 in accordance with a modulation commands (e.g., pulse width modulation commands or space vector pulse width modulation commands) of the driver controller or electronic data processing system 100. After the start-up mode and during the transitional excitation mode, the first set and second set of blocking diodes (32, 34) are reverse-biased so that the power supplies do not contribute to charging during the transitional excitation mode, where the increase in the direct current voltage is based solely on the electromagnetic fields generated or induced by the rotor moving in the electrical machine.

Collectively, the start-up mode and the transitional excitation mode shall be referred to as the self-excitation stage or start-up stage. The self-excitation stage or the start-up stage is not entirely synonymous with the start-up mode because the self-excitation stage includes both the start-up mode and the transitional excitation mode.

In one embodiment, the induction machine 55 may comprise an induction generator or an induction machine, such as a three-phase, squirrel-cage induction machine (SCIM).

The start-up mode (e.g., the weak pre-charge mode) and the operational mode are mutually exclusive and do not occur simultaneously. For example, a transition can occur (e.g., in a transitional excitation mode) between the start-up mode (e.g., weak pre-charge mode) and the operational mode when the charge stored by the capacitor 26 is sufficient to excite or self-excite one or more windings of the induction generator (e.g., 55), which is capable of producing high voltage electrical energy (e.g., 200 volts direct current or greater) on the direct current terminals (28, 30) during an operational mode. During the transitional excitation mode or during an initial time period of the operational mode, the high voltage electrical energy is ramped up from a start-up voltage between the direct current terminals (28, 30) during a start-up mode. During the transitional excitation mode, it can be premature to introduce a load (e.g., switchable load) to the direct current terminals (28, 30) prior to completion of the voltage ramp-up on the direct current terminals because a premature introduction of a load on the direct current bus can interfere with adequate energy storage in the capacitor 26 for a sustained ramp up to a target output voltage on the direct current terminals.

In one configuration, the first control switch 42 ($S_1$) and the third control switch 46 ($S_3$) are off, or inactive, during the start-up mode, whereas the second control switch 44 ($S_2$) and the fourth control switch 48 ($S_4$) are on or active during the start-up mode to deactivate the first switch 12 ($A_1$) and the second switch 14 ($A_2$). To control the first switch 12 and the second switch 14, the first control switch 42 and the third control switch 46, respectively, alternate between off and on during an operational mode in accordance with modulation commands (e.g., pulse-width modulation (PWM)) from a controller after self-excitation of the (rotating) magnetic and electrical fields from the direct current provided by the capacitor 26 in one or more (stator) windings associated of the induction machine (e.g. induction generator) with the first phase output terminal 53.

In one embodiment, the induction machine 55 or generator comprises an induction machine without any energy storage device connected between the direct current voltage terminals (28, 30), except for the capacitor 26, and without any capacitor connected to the first phase output terminal 53 or any other phase output terminal (153, 253) their corresponding alternating current terminals of the induction machine. In certain embodiments, the induction machine 55 does not include any permanent magnets in or for the rotor windings, the stator windings, or both.

Before the self-excitation scheme has been initialized and during the start-up mode, the first set of diodes 32 ($D_1$) and the second set of diodes 34 ($D_2$) and are forward biased and charge the direct current bus (28, 30) to a primary voltage or start-up voltage, such as approximately 20 volts direct current (VDC) or greater (e.g., at the end of the first time period, $T_1$ in FIG. 6B). During the transitional excitation mode (e.g., after self-excitation scheme is initialized) or during the operational mode of the induction machine 55, the first set of diodes 32 and the second set of diodes 34 become reverse biased as the voltage between the direct current terminals (28, 30) rises, increases, or ramps up to a final, peak or steady-state secondary voltage (e.g. secondary voltage level or high voltage of approximately 200 volts direct current or greater). During the transitional excitation mode or operational mode, the reverse bias of the first set of diodes 32 and the second set of diodes 34 results from the alternating current induced in the first phase winding 57 (e.g., Phase A) of the induction generator or induction machine 55 as the induction generator converts mechanical rotational energy into electrical energy. The reverse bias of the diodes (32, 34) ends the trickle charging of the direct current capacitor 26.

The final, peak or steady-state secondary voltage across the direct current bus terminals may comprise the target operational direct current voltage at the end of the third time period, $T_3$, or during the fourth time period, $T_4$, in FIG. 6B. In one embodiment, the secondary voltage equals the start-up voltage plus a transitional voltage that ramps up or changes over time before reaching the final, peak, steady-state secondary voltage, or the target operational direct current voltage. For example, the secondary voltage may ramp up from approximately 20 volts direct current (VDC) to approximately 200 volts direct current or greater, where the primary voltage as approximately 20 volts direct current. During the transitional excitation mode or operational mode, the reverse bias of the first set of diodes 32 and the second set of diodes 34 results from the alternating current induced in the first phase winding 57 (e.g., Phase A) of the induction generator or induction machine 55 as the induction generator converts mechanical rotational energy into electrical energy.

Before the self-excitation scheme is initialized, the first switch 12 ($A_1$) and the second switch 14 ($A_2$) are turned off in the start-up mode. During the operational mode, once the self-excitation scheme is initialized the driver controller (e.g., first phase driver 18) or electronic data processing system 100 controls the switching states (on or off states) of the first switch 12 and the second switch 14 in accordance with a control scheme. For example, the second control switch 44 and the fourth control switch 48 are on during the start-up mode to keep the first switch 12 and the second switch 14 off during the start-up mode. However, during the operational mode, the first control switch 42 and the second control switch 44 alternate between on and off; the third control switch 46 and the fourth control switch 48 alternate between on and off, such as in accordance with modulation commands (e.g., pulse width modulation or space-vector pulse width modulation) by the first phase driver 18.

In one embodiment, the first output voltage level (e.g., +15 VDC) is greater than the second output voltage level (e.g., −8 VDC), and the capacitor 26 is charged to the primary voltage (e.g., primary voltage level) of approximately twice the first voltage level, less a first voltage drop associated with the first set of diodes 32 and a first resistor 36 in series with the first set of diodes 32 and less a second voltage drop associated with the second set of diodes 34 and a second resistor 36 in series with the second set of diodes 34. Although the first resistor and the second resistor may comprise a one kilo-ohm resistor, any other suitable resistance may be used to set, limit or manage the level of the electrical current that trickle charges the capacitor 26.

FIG. 2 is one embodiment of a schematic representation of an inverter system 111 with three-phases that are connected to an induction machine 55 or generator, where the inverter system 111 comprises one or more drivers (18, 118, 218). The inverter system 111 of FIG. 2 is similar to the inverter system 11 of FIG. 1 except the system 111 of FIG. 2 has three-phases of switches and drivers, whereas the inverter system 11 of FIG. 1 only has a single phase of switches and drivers. Further, the system of FIG. 2 illustrates the connection or coupling of an induction machine 55 or induction generator to the inverter system. Like reference numbers in FIG. 1 and FIG. 2 indicate like elements or features.

The first phase (or phase A) of FIG. 2 is identical to the description of the inverter system of FIG. 1. The second phase (Phase B) and the third phase (Phase C) are similar to the first phase (Phase A), except each phase is associated with an output terminal (53, 153, 253) with an alternating current signal (e.g., generally sinusoidal waveform) with a different phase than the other alternating current signals of the other phases.

In FIG. 2, the second phase of FIG. 2 comprises a third switch 112 having third switched terminals 154 and a third control terminal 150. A fourth switch 114 has fourth switched terminals 156 and a fourth control terminal 152. The switched terminals (154, 156) of the third switch 112 and the fourth switch 114 are coupled in series between the direct current voltage terminals (28, 30).

In one embodiment, if the third switch 112 comprises a transistor, such as a bipolar junction transistor or an IGBT, the third switched terminals 154 comprise an emitter and a collector. The third control terminal 150 of the third switch 112 may comprise a gate or a base of the third switch 112. In one embodiment, if the third switch 112 comprises a field-effect transistor, the third switched terminals 154 comprise a source and a drain. The third control terminal 150 of the third switch 112 may comprise a gate or a base.

Similarly, in one embodiment, if the fourth switch 114 comprises a transistor, such as a bipolar junction transistor or an IGBT, the fourth switched terminals 156 comprise an emitter and a collector. The fourth control terminal 152 of the fourth switch 114 may comprise a gate or a base of the fourth switch 114. In one embodiment, if the fourth switch 114 comprises a field-effect transistor, the fourth switched 156 terminals comprise a source and a drain. The fourth control terminal 152 of the fourth switch 114 may comprise a gate or a base of the fourth switch 114.

In the second phase, a protection diode or free-wheeling diode (113, 115) may be connected between the switched terminals of each switch (112, 114) to protect the switch from transient currents that occur during switching transitions of the third switch 112 and the fourth switch 114. For example, the third protection diode 113 may conduct to dissipate transient energy associated with an electrical energy spike when the third switch 112 is switched off and the inductive motor winding, motor or induction machine 55 induces the energy spike. Similarly, the fourth protection diode 115 may conduct to dissipate transient energy associated with an electrical energy spike when the fourth switch 114 is switched off and the inductive motor winding or motor induces the energy spike. An electric machine 55 or generator has one or more windings (57, 157, 257). A second phase output terminal 153 is associated with the switched terminals (154, 156) between the third switch 112 and the fourth switch 114. In one configuration, the first phase output terminal 53 is coupled to the first winding 53 and the second phase output terminal 153 is coupled to a second winding 157 of the induction machine 55 or generator. In some configurations, the first, second and third windings may be configured with a common node 56 that is electrically grounded to ground, chassis ground, or chassis neutral.

A second phase driver 118 comprises a third power supply 122 and a fourth power supply 124 that are controlled by, modulated by, or switched by a driver module 614, controller or the electronic data processing system 100. In one embodiment, the third power supply 122 comprises a first voltage source 38 and a second voltage source 40. Meanwhile the fourth power supply 124 comprises a first voltage source 38 and a second voltage source 40.

In one embodiment, the second phase driver 118 comprises a third biasing network 133; the third biasing network 133 comprises a third set of blocking diodes 132 that are cascaded in series between one of the direct current terminals 28 and a node 137 associated with the third power supply 122 and a fifth control switch 142 ($S_5$) of the second phase driver 118. In one embodiment, the second phase driver 118 comprises a fourth biasing network 135; the fourth biasing network 135 comprises a fourth set of blocking diodes 134 that are cascaded in series between the second phase output terminal 153 and a node 139 associated with the fourth power supply 124 and a seventh control switch 146 ($S_7$) of the second phase driver 118.

In one configuration, the first phase output terminal 53 and the second phase output terminal 153 of the inverter 111 are connected in parallel to the induction machine 55 or to the respective phase windings of the induction machine 55 to enhance collectively the output power capacity of the first voltage supply 22, the second voltage supply 24, the third voltage supply 122 and the fourth voltage supply 124 to aid (e.g., decrease the duration of the transitional excitation mode or increase the slope of the ramp-up of the direct current voltage during the transitional excitation mode from a start-up voltage to a target direct current operational voltage) in the self-excitation of an induction machine.

In one embodiment, the first output level provides electrical energy via the first set of blocking diodes 32 and via the second set of blocking diodes 34 to the capacitor 26 to charge or trickle charge the capacitor 26 to achieve the start-up voltage level to start the self-excitation of alternating current flux in one or more windings (of the induction machine 55) associated with the first phase output terminal 53 (e.g., during the transitional excitation mode). In another embodiment, the first output level provides electrical energy via the third set of blocking diodes 132 and via the fourth set of blocking 134 to the capacitor to charge or trickle charge the capacitor 26 to achieve the primary voltage level or start-up voltage level to start the self-excitation of alternating current flux in one or more windings (of the induction machine 55) associated with the second phase output terminal 153 (e.g., during the transitional excitation mode).

One or more resistors may be associated with the third control terminal 150 and the fourth control terminal 152. For example, a first input resistor 20 (e.g., first gate resistor) is coupled between the third control terminal 150 and a terminal of the fifth control switch 142 ($S_5$), whereas a second input resistor 21 (e.g., second gate resistor) is coupled between the third control terminal 150 and a terminal of the sixth control switch 144 ($S_6$). For example, a first input resistor 20 (e.g., first gate resistor) is coupled between the fourth control terminal 152 and a terminal of the seventh control switch 146 ($S_7$), whereas a second input resistor 21 (e.g., second gate resistor) is coupled between the fourth control terminal 152 and a terminal of the eighth control switch 148 ($S_8$).

A third power supply 122 provides a first output voltage level and a second output level switchable (via the fifth control switch 142 and the sixth control switch 144) to the third control terminal 150 of the third switch 112, where the first output level is distinct from the second output level. A fourth power supply 124 provides the first output voltage level and the second output level switchable (via the seventh control switch 146 and the eighth control switch 148) to the fourth control terminal 152 of the fourth switch 114.

In one embodiment, the third power supply 122 is associated with a node 137 at the first output voltage level, where the fifth control switch ($S_5$) 142 controls or switches the electrical connection between the node 137 and third control terminal 150 of the third switch 112; the third power supply 122 is associated with a node at the second output voltage level, where the sixth control switch ($S_6$) 144 controls or switches the electrical connection between the node at the second output level and the third control terminal 150.

In one embodiment, a third power supply 122 (e.g., third voltage supply) provides a first output voltage level and a second output level switchable to the third control terminal 150 of the third switch 112. The first output level provides electrical energy via the third set of blocking diodes 132 to the capacitor 26 to trickle charge the capacitor 26 for self-excitation of alternating current flux in a second winding 157 associated with the second phase output terminal 153.

Similarly, the fourth power supply 124 is associated with a seventh control switch ($S_7$) 146 with switch terminals connected between the fourth control terminal 152 and a node 139 at the first output voltage level; the fourth power supply 124 is associated with an eighth control switch ($S_8$) 148 with switch terminals between a node at the second output level and the fourth control terminal 152. A fourth voltage supply 124 provides the first output voltage level and the second output level switchable (via the seventh control switch 146 and the eighth control switch 148) to the fourth control terminal 152 of the fourth switch 114. The first output level provides electrical energy via the fourth set of blocking diodes 134 to the capacitor 26 to charge (e.g., trickle) charge the capacitor 26 for excitation or self-excitation of alternating current flux in the second windings 157 associated with the second phase output terminal 153.

In one configuration, the fifth control switch ($S_5$) 142 and the seventh control switch ($S_7$) 146 are off, or inactive, during the start-up mode. During the start-up mode and prior to the operational mode (e.g., generating mode of the induction machine 55), the third switch ($B_1$) 112 and the fourth switch 114 $B_2$ are turned off. Further, in one embodiment, the sixth control switch 144 is on during the start-up mode to keep the third switch ($B_1$) 112 off and the eighth control switch 148 is on during the start-up mode to keep the fourth switch ($B_2$) 114 off during the start-up mode.

In the start-up mode, the third power supply 122 and the fourth power supply 124 simultaneously each provide electrical energy at the first voltage level in series via the third set of blocking diodes 132 and the fourth set of blocking diodes 134 to the capacitor 26 to charge (e.g. trickle charge)

the capacitor 26 for excitation or self-excitation of electromagnetic fields to produce (rotating and) alternating current in the second winding 157 associated with the second phase output terminal 153. Collectively, the voltage applied to charge (e.g., trickle charge) the capacitor 26 is approximately twice the first voltage level, less voltage drops in the forward biased diodes of the third set of diodes 132 and the fourth set of diodes 134 and less the voltage drop in any applicable resistors 36.

In an operational mode after charging (e.g., fully charging or trickle charging) the capacitor 26 to a startup-voltage or primary voltage (e.g., pre-charge voltage that is sufficient to enable the inverter or the transitional mode), the first output level can be applied to the activate the third switch 112 or the fourth switch 114, whereas the second output level is applied to deactivate the third switch 112 or the fourth switch 114 in accordance with a modulation commands (e.g., pulse width modulation commands) of the second phase driver 118, the driver controller or the electronic data processing system 100. As previously indicated, the start-up mode (e.g., weak pre-charge mode) and the operational mode are mutually exclusive and do not occur simultaneously.

During an operational mode (e.g., or during the transitional excitation mode), the fifth control switch 142, the sixth control switch 144, the seventh control switch 146 and the eighth control switch 148 alternate between off and on in accordance with modulation commands (e.g., pulse-width modulation (PWM)) from a controller or space vector pulse width modulation (SVPWM)) after self-excitation of the alternating current flux in one or more windings associated with the second phase output terminal 153. Before the self-excitation scheme has been initialized, the third set of diodes 132 and the fourth set of diodes 134 (and, more generally, diodes $D_1$ to $D_6$) are forward biased and charge the capacitor 26 across the direct current voltage terminals (28, 30) to a start-up voltage or primary voltage, such as approximately 20 VDC or another suitable charging voltage for charging (e.g., trickle-charging or gradual charging) of the capacitor 26. During the transitional excitation mode or the operational mode, the third set of diodes 132 and the fourth set of diodes 134 become reverse biased as the voltage between the direct current terminals (28, 30) rises above the start-up voltage to an initial secondary voltage (e.g., 30 VDC).

During the transitional excitation mode (e.g., after the self-excitation scheme is initialized) or during the operational mode, the induction machine 55, the first set of diodes 32 and the second set of diodes 34 become reverse biased as the voltage between the direct current terminals (28, 30) rises or ramps up to a final, peak or steady-state secondary voltage (e.g. high voltage of approximately 200 volts direct current or greater). For example, the final, peak or steady-state secondary voltage may comprise the target operational direct current voltage at the end of the third time period, T3, or during the fourth time period, T4, in FIG. 6B. In one embodiment, the secondary voltage equals the start-up voltage plus a transitional voltage that ramps up or that changes over time before reaching the final, peak, steady-state secondary voltage, or the target operational direct current voltage. For example, the secondary voltage may ramp up from approximately 30 volts direct current (VDC) to approximately 200 volts direct current or greater, where the primary voltage as approximately 20 volts direct current.

Once the self-excitation scheme is initialized during the operational mode, the second phase driver 118, the driver controller or electronic data processing system 100 controls the switching states (on or off states) of the third switch 112 and the fourth switch 114 in accordance with a control scheme (e.g., pulse width modulation or space-vector pulse width modulation). Accordingly, during the operational mode, the fifth control switch 142 and the sixth control switch 144 alternate between on and off, and the seventh control switch 146 and the eighth control switch 148 alternate between on and off.

In one embodiment, the first output voltage level (e.g., +15 VDC) is greater than the second output voltage level (e.g., −8 VDC), and the capacitor 26 is charged to approximately twice the first voltage level, less a first voltage drop associated with the third set of diodes 132 and a first resistor 36 in series with the third set of diodes 132 and less a second voltage drop associated with the fourth set of diodes 134 and a second resistor 36 in series with the fourth set of diodes 134. Although the first resistor 36 and the second resistor 36 may comprise a one kilo-ohm resistor, any other suitable resistance may be used to set, limit or manage the level of the current that trickle charges the capacitor 26.

In FIG. 2, the third phase of FIG. 2 comprises a fifth switch 212 having fifth switched terminals 254 and a fifth control terminal 250. A sixth switch 214 has sixth switched terminals 256 and a sixth control terminal 252. The switched terminals (254, 256) of the fifth switch 212 and the sixth switch 214 are coupled in series between the direct current voltage terminals (28, 30).

In one embodiment, if the fifth switch 212 comprises a transistor, such as a bipolar junction transistor on an IGBT, the fifth switched terminals 254 comprise an emitter and a collector. The fifth control terminal 250 of the fifth switch 212 may comprise a gate or a base of the fifth switch 212. In one embodiment, if the fifth switch 212 comprises a field-effect transistor, the fifth switched terminals 256 comprise a source and a drain. The fifth control terminal 250 of the fifth switch 212 may comprise a gate or a base.

Similarly, in one embodiment, if the sixth switch 214 comprises a transistor, such as a bipolar junction transistor or an IGBT, the sixth switched terminals 256 comprise an emitter and a collector. The sixth control terminal 252 of the sixth switch 214 may comprise a gate or a base of the sixth switch 214. In one embodiment, if the sixth switch 214 comprises a field-effect transistor, the sixth switched terminals 256 comprise a source and a drain. The sixth control terminal 252 of the sixth switch 214 may comprise a gate or a base of the sixth switch 214.

In the third phase, a protection diode or free-wheeling diode (213, 215) may be connected between the switched terminals of each switch to protect the switch from transient currents that occur during switching transitions of the fifth switch 212 and the sixth switch 214. For example, a fifth protection diode 213 may conduct when the sixth switch 214 is in an on state, whereas the sixth protection diode 215 may conduct when the fifth switch 212 is in an on state.

An electric machine 55 or generator has one or more windings (57, 157, 257). A third phase output terminal 253 is associated with the switched terminals (254, 256) between the fifth switch 212 and the sixth switch 214. In one configuration, the third phase output terminal 253 is coupled to the third winding 257 of the induction machine 55 or generator. In some configurations, the first, second and third windings may be configured with a common node 56 that is electrically grounded to ground, chassis ground, or chassis neutral.

A third phase driver 218 comprises a fifth power supply 222 and a sixth power supply 224 that are controlled by, modulated by, or switched by a driver module 614, a driver controller or the electronic data processing system 100. In one embodiment, the fifth power supply 222 comprises a first voltage source 38 and a second voltage source 40. Meanwhile the sixth power supply 224 comprises a first voltage source 38 and a second voltage source 40.

In one embodiment, the third phase driver 218 comprises a fifth biasing network 233; the fifth biasing network 233 comprises a fifth set of blocking diodes 232 that are cascaded in series between one of the direct current terminals 28 and a node 237 associated with the fifth power supply 222 and a terminal of a ninth control switch 242 ($S_9$) of the third phase driver 218. In one embodiment, the third phase driver 218 comprises a sixth biasing network 235; the sixth biasing network 235 comprises a sixth set of blocking diodes 232 that are cascaded in series between the third phase output terminal 253 and a node 239 associated with the sixth power supply 224 and an eleventh control switch 246 ($S_{11}$) of the third phase driver 218.

One or more resistors may be associated with the fifth control terminal 250 and the sixth control terminal 152. For example, a first input resistor 20 is coupled between the fifth control terminal 250 and a terminal of the ninth control switch 242, whereas a second input resistor 21 is coupled between the fifth control terminal 250 and a terminal of the tenth control switch 244. For example, a first input resistor 20 is coupled between the sixth control terminal 252 and a terminal of the eleventh control switch 246, whereas a second input resistor 21 is coupled between the sixth control terminal 252 and a terminal of the twelfth control switch 248.

A fifth power supply 222 provides a first output voltage level and a second output level switchable (via the ninth control switch 242 or the tenth control switch 244) to the fifth control terminal 250 of the fifth switch 212, where the first output level is distinct from the second output level. A sixth power supply 224 provides the first output voltage level and the second output level switchable (via the eleventh control switch 246 or the twelfth control switch 248) to the sixth control terminal 252 of the sixth switch 214.

In one embodiment, the fifth power supply 222 is associated with a node 237 at the first output voltage level, where the ninth control switch ($S_9$) 242 controls or switches the electrical connection between the node 237 and fifth control terminal 250 of the fifth switch 212 ($C_1$); the fifth power supply 222 is associated with a node at the second output voltage level, where the tenth control switch ($S_{10}$) 244 controls or switches the electrical connection between the node at the second output level and the fifth control terminal 250. In one embodiment, a fifth power supply 222 (e.g., fifth voltage supply) provides a first output voltage level and a second output level switchable to the fifth control terminal 250 of the fifth switch 212. The first output level provides electrical energy via the fifth set of blocking diodes 232 to the capacitor 26 to charge (e.g., trickle charge) the capacitor 26 for excitation or self-excitation of alternating current flux in the third winding 257 associated with the third phase output terminal 253.

Similarly, the sixth power supply 224 is associated with an eleventh control switch ($S_{11}$) 246 with switch terminals connected between the sixth control terminal 252 and a node 239 at the first output voltage level; the sixth power supply 224 is associated with a twelfth control switch ($S_{12}$) 248 with switch terminals between a node at the second output level and the sixth control terminal 252. A sixth power supply 224 provides the first output voltage level and the second output level switchable to the sixth control terminal 252 of the sixth switch 214 ($C_2$). The first output level provides electrical energy via the sixth set of blocking diodes 234 to the capacitor 26 to charge (e.g., trickle charge) the capacitor 26 for excitation or self-excitation of alternating current flux in the third winding 257 associated with the third phase output terminal 253.

In one configuration, the ninth control switch ($S_9$) 242 and the eleventh control switch ($S_{11}$) 246 are off, or inactive, during the start-up mode (e.g., weak pre-charge mode). During the start-up mode and prior to the operational mode (e.g., generating mode of the induction machine 55), the fifth switch ($C_1$) 212 and the sixth switch ($C_2$) 214 are turned off. Further, in one embodiment, the tenth control switch 244 is on during the start-up mode to keep the fifth switch ($C_1$) 212 off and the twelfth control switch 248 is on during the start-up mode to keep the sixth switch ($C_2$) 214 off during the start-up mode.

In a start-up mode (e.g., weak pre-charge mode), the fifth power supply 222 and the sixth power supply 224 simultaneously each provide electrical energy at the first voltage level in series via the fifth set of blocking diodes 232 and the sixth set of blocking diodes 234 to the capacitor 26 to charge (e.g., trickle charge) the capacitor 26 for excitation or self-excitation electromagnetic fields to produce (rotating and) alternating current in the third windings 257 associated with the third phase output terminal 253 (e.g., to enable entry into the transitional excitation mode). Collectively, the voltage applied to charge (e.g., trickle charge) the capacitor 26 is approximately twice the first voltage level, less voltage drops in the forward biased diodes of the fifth set of diodes 232 and the sixth set of diodes 234 and less the voltage drop in any applicable resistors 36.

In an operational mode after charging (e.g., partially or fully charging) the capacitor 26 to a start-up voltage or primary voltage (e.g., sufficient to enable activation of the inverter switches), the first output level can be applied to the activate the fifth switch 212 or the sixth switch 214, whereas the second output level is applied to deactivate the fifth switch 212 or the sixth switch 214 in accordance with a modulation commands (e.g., pulse width modulation commands) of the third phase driver 218, the driver controller or the electronic data processing system 100. The start-up mode (e.g., weak pre-charge mode) and the operational mode are mutually exclusive and do not occur simultaneously.

During an operational mode (e.g., or in the transitional excitation mode), the ninth control switch 242, the tenth control switch 244, the eleventh control switch 246 and the twelfth control switch 248 alternate between off and on during an operational mode in accordance with modulation commands (e.g., pulse-width modulation (PWM)) from a controller or space vector pulse width modulation (SVPWM)) after self-excitation of the of alternating current flux in one or more windings associated with the third phase output terminal 253. Before the self-excitation scheme has been initialized, the fifth set of diodes 232 and the sixth set of diodes 234 (and, more generally, diodes $D_1$ to $D_6$) are forward biased and charge the capacitor 26 across the direct current voltage terminals (28, 30) to a start-up voltage or primary voltage, such as approximately 20 VDC or another suitable charging voltage for charging (e.g., trickle-charging or gradual charging) of the capacitor 26. During the transitional excitation mode or during the operational mode, the fifth set of diodes 232 and the sixth set of diodes 234 become reverse biased as the voltage between the direct current terminals (28, 30) rises above the start-up voltage to an initial secondary voltage (e.g., 30 VDC) from induced energy of the electromagnetic fields in the induction machine.

During the transitional excitation mode (e.g., after the self-excitation scheme is initialized) or during the operational mode of the induction machine 55, the fifth set of diodes 232 and the sixth set of diodes 234 become reverse biased as the voltage between the direct current terminals (28, 30) rises or ramps up to a final, peak or steady-state secondary voltage (e.g. high voltage of approximately 200 volts direct current or greater) from induced energy of the electromagnetic fields in the induction machine subject to rotational energy applied to its rotor.

In one embodiment, the secondary voltage equals the start-up voltage plus a transitional voltage that ramps up or changes over time during a transitional excitation mode before reaching the final, peak, steady-state secondary voltage, or target operational direct current voltage. For example, the secondary voltage may ramp up from approximately 30 volts direct current (VDC) to approximately 200 volts direct current or greater, where the primary voltage as approximately 20 volts direct current.

Once self-excitation scheme is initialized or during the operational mode, the third phase driver 218, the driver controller or electronic data processing system 100 controls the switching states (on or off states) of the fifth switch 212 and the sixth switch 214 in accordance with a control scheme (e.g., pulse width modulation or space-vector pulse width modulation). Accordingly, during the operational mode, the ninth control switch 242 and the tenth control switch 244 alternate between on and off, and the eleventh control switch 246 and the twelfth control switch 248 alternate between on and off.

In one embodiment without limiting the scope of the disclosure or appended claims, the first output voltage level (e.g., +15 VDC) is greater than the second output voltage level (e.g., −8 VDC), and the capacitor 26 is charged to approximately twice the first output voltage level, less a first voltage drop associated with the fifth set of diodes 232 and a first resistor 36 in series with the fifth set of diodes 232 and less a second voltage drop associated with the sixth set of diodes 234 and a second resistor 36 in series with the sixth set of diodes 234. Although the first resistor 36 and the second resistor 36 may comprise a one kilo-ohm resistor, any other suitable resistance may be used to set, limit or manage the level of the current that trickle charges the capacitor 26.

In summary, before the self-excitation scheme is initialized to transition to or facilitate the operational mode and during the start-up mode (e.g., weak pre-charge mode), the switches $A_1$, $A_2$, $B_1$, $B_2$, $C_1$, $C_2$ are turned off. Once self-excitation scheme is initialized during the transitional excitation mode and during the operational mode, the switches $A_1$, $A_2$, $B_1$, $B_2$, $C_1$, $C_2$ are gated or controlled by the electronic data processing system 100 as per the control scheme in accordance with the software instructions or modules described in conjunction with FIG. 5A, or otherwise. However, during the transitional excitation mode a load (on the direct current bus, such as an inverter coupled to a motor 302, a battery 304, a resistive load 306) may be reduced, limited, reactance-managed, impedance-restricted, or disconnected from the direct current bus or the output of the induction machine 55 to support the ramping up of the direct current voltage to the full operational target direct current voltage.

The generator comprises an induction machine 55 (e.g., a squirrel cage induction machine 55) without any energy storage device connected between the direct current voltage terminals (28, 30), except for the capacitor 26, and without any capacitor 26 connected to the first phase output terminal 53 (or any other alternating current terminal of the induction machine 55). In one configuration, the induction machine 55 does not include any permanent magnets in or for the rotor.

In certain configurations, the generator generates an operational voltage level exceeding approximately six hundred (600) volts, such as approximately seven hundred (700) volts, during an operational mode after the capacitor 26 is trickle-charged during the start-up mode to a start-up voltage level that exceeds approximately fifteen (15) volts, such as approximately twenty (20) volts to approximately thirty (30) volts.

Figure 3A:
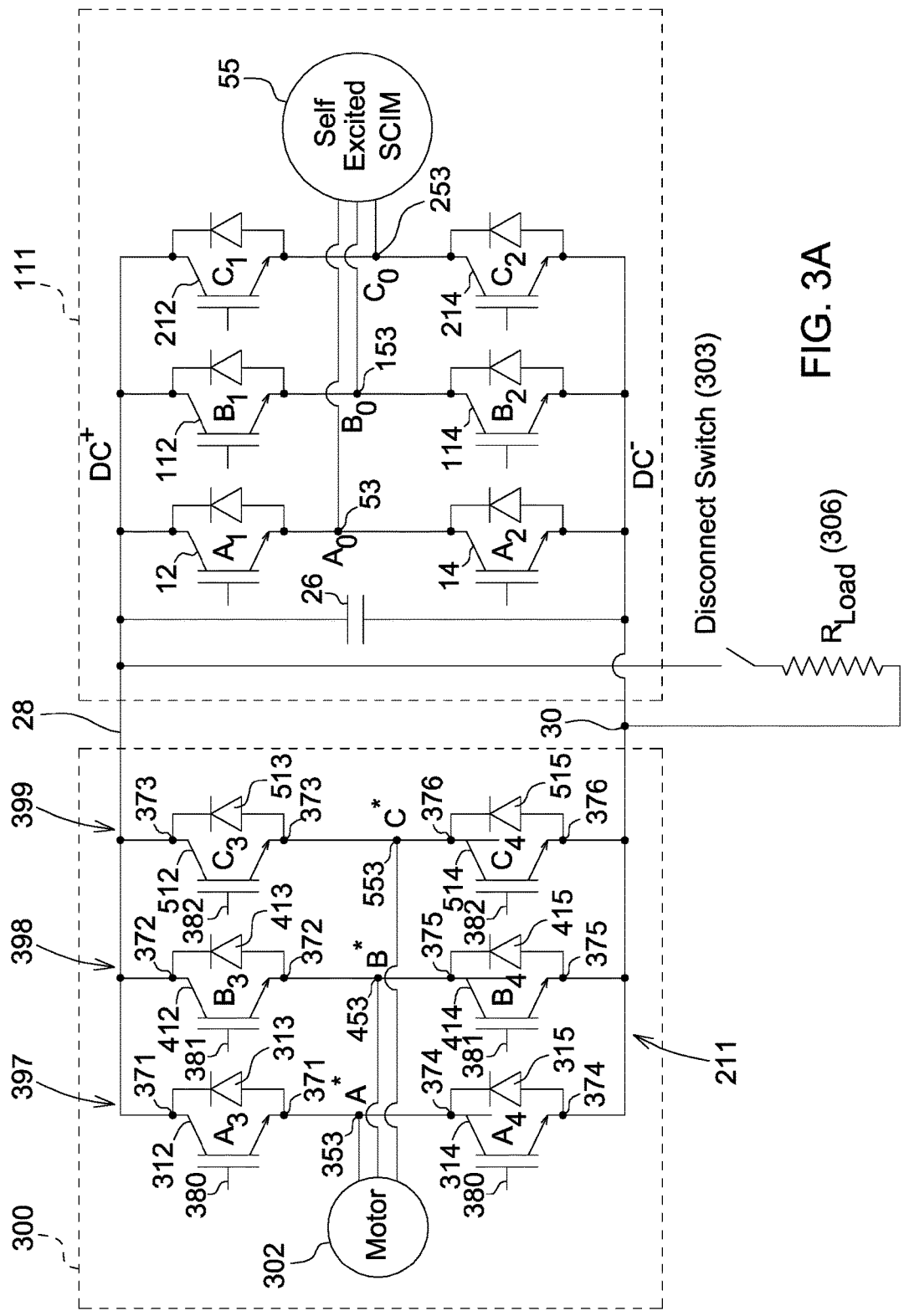
FIG. 3A is another embodiment of a schematic representation of an inverter system that is connected to an induction generator, an active load that comprises a secondary inverter and an electric motor, and a passive load that comprises a switched resistive load.

FIG. 3A is another embodiment of a schematic representation of an inverter system 111 that is connected to an induction generator 55, an active load 300 that comprises a secondary inverter 211 and an electric motor 302, and a passive load that comprises a resistive load 306 or a disconnectable resistive load. In practice, the active load 300 is disabled or disconnected by the controller or data processing system 100 during excitation of the inverter system 111 or primary inverter. Like reference numbers in FIG. 2 and FIG. 3A indicate like elements.

In one embodiment, a secondary inverter 211 comprises a pair of input control terminals (380, 381, 382) for each phase (397, 398, 399) and an output terminal (353, 453, 553) for each phase. Each phase (397, 398, 399) comprises an upper switch (312, 412, 512) and a lower switch (314, 414, 514) with switched terminals (371, 372, 373, 374, 375, 376) that are coupled together at the output terminal (353, 453, 553) from each phase. Other switched terminals (371, 372, 373, 374, 375, 376) of the upper switch (312, 412, 512) and the lower switch (314, 414, 514) are coupled to the direct current voltage terminals (28, 30) (e.g., direct current bus). The input control terminals (380, 381, 382) are connected to or associated with a driver module 614 or electronic data processing system 100 for controlling the states of the upper switch (312, 412, 512) and the lower switch (314, 414, 514) for each phase in accordance with a controller 106 or electronic data processing system 100. As illustrated, the secondary inverter has three phases with phase output terminals 353 (A*), phase 453 (B*) and phase 553 (C*).

In one embodiment, the induction machine 55 of FIG. 3A comprises an induction generator with a shaft that is rotated or driven by a prime mover, an internal combustion engine, or another source of rotational energy. The windings of the induction machine 55 are self-excited by the capacitor 26 to support generation or conversion of the rotational energy of the induction machine 55 into electrical energy.

The output phase terminals (53, 153, 253) of the inverter system 111 or primary inverter are coupled to one or more windings of the induction generator 55 (e.g., self-excited squirrel-cage induction machine) and receive alternating current generated by the induction generator 55. The inverter system 111 or primary inverter convers the alternating current received from the induction generator into direct current to charge the capacitor 26 across the direct current voltage terminals (28, 30) (e.g. DC bus) and to provide electrical energy to one or more active loads 300 or passive loads (e.g., 306).

In one configuration, the secondary inverter 211 and the electric motor 302 comprise an active load 300 on the generator. The secondary inverter 211 uses the electrical energy on the direct current voltage terminals (28, 30) to provide or output alternating current at the output terminals (353, 453, 553), such as phase A*, phase B* and phase C*, which are coupled to the motor 302. A data processing system 100 or controller controls the inputs of the secondary inverter 211 in accordance with a modulation scheme, such as pulse width modulation scheme at the control terminals of the switches to product a suitable alternating current signal (e.g., one or more substantially sinusoidal signals or other suitable waveforms) for controlling the torque, velocity, speed and direction of the motor 302. An electric motor 302 is coupled to the alternating current output terminals. The secondary inverter 211 is adapted to control the electric motor 302 through signals provided at the alternating current output terminals.

During excitation through one or more switches in series with direct current voltage terminals (28, 30, or both), the controller or data processing system 100 can disable or disconnect the active load 300 from the primary inverter or inverter system 111.

A resistive load 306 or a load may be placed across the terminals of the direct current voltage terminals (28, 30) if or when the inverter system 111 or primary inverter is operating in the operational mode after the start-up mode. The disconnect switch 303 is used to connect or disconnect the resistive load 306, inductive load, or other load to the direct current voltage terminals (28, 30) at an appropriate time, such as during the operational mode or to transition the disconnect switch 303 to an on state upon completion of the start-up mode.

Figure 3B:
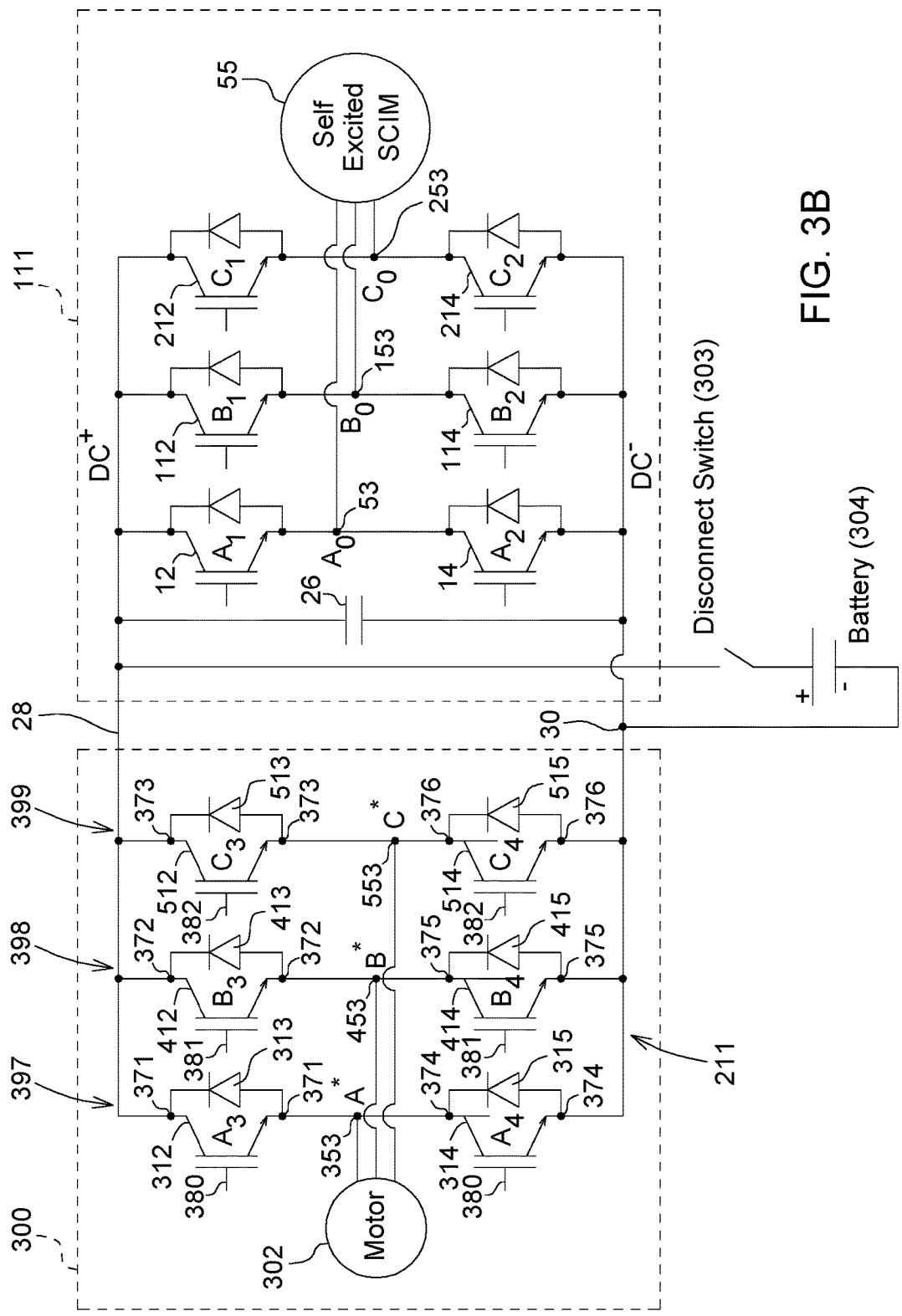
FIG. 3B is another embodiment of a schematic representation of an inverter system that is connected to an induction generator, an active load that comprises a secondary inverter and an electric motor, and a battery, which can act as a passive load when discharged.

FIG. 3B is another embodiment of a schematic representation of an inverter system 111 that is connected to an induction generator 55, an active load 300 that comprises a secondary inverter 211 and an electric motor 302, and a battery 304. The system of FIG. 3B is similar to the system of FIG. 3A except the resistive load 306 of FIG. 3A is replaced by the battery 304 of FIG. 3B. Like reference numbers in FIG. 3B indicate like elements or features in FIG. 2 and FIG. 3A.

In the embodiment of FIG. 1, FIG. 2, and FIG. 3A, there is no battery 304 between the direct current voltage terminals (28, 30) (e.g., direct current bus terminals) and only the capacitor 26 (e.g., electrolytic capacitor 26) is used to excite the windings of the induction machine 55 or induction generator. However, in an alternate embodiment of FIG. 3B a battery 304 is coupled between the direct current voltage terminals (28, 30), and may have a direct current voltage interface to step-up or step-down the voltage to the proper level for maintenance, charging and discharging of the battery 304. As indicated previously, the charged capacitor 26 alone (without any battery 304) can excite the windings in the induction machine 55 or induction generator. Further, in the alternate embodiment, the charged capacitor 26 can alone (e.g., charged to a primary voltage around 20 volts direct current) excite the windings in the induction generator 55, alone or together with the battery 304, can excite the windings in the induction generator 55.

In another alternate embodiment, the electrical direct current load or battery 304 is coupled to the direct current terminals (28, 30) via a load disconnect switch 303 that is off (or in an open state) during a start-upstage (e.g., during the start-up mode and during self-excitation in the transitional excitation mode) and on (or in a closed state or conducting state) during an operational mode. In practice, during the start-up stage or excitation stage the battery 304 can be disconnected and not used for excitation and the controller 106 can disable or can electrically isolate the inverter from any active induction machine 55 or motor during excitation. For instance, a data processor 128 or electronic data processing system 100 controls a disconnect switch 303: (1) to decouple (e.g., optionally) the electrical direct current load or battery 304 between the direct current terminals during a start-up mode or during a start-up stage, and/or (2) to couple the electrical direct current load or battery 304 between the direct current terminals during the operational mode (e.g., during power generation of the induction generator 55 or machine) and after (not during) the start-up mode or start-up stage (e.g., during charging of the capacitor 26).

Here, a discharged battery, which can amount to battery 304 from time to time, can be modeled as a resistive load or reluctance load. In other words, the load or battery is connected to the direct current terminals (28, 30) after self-excitation or the self-excitation stage of the windings in the induction machine 55 are complete such that the load (304 or 306) can use the electrical energy generated by the induction machine 55 or induction generator. In certain configurations, the start-up mode and transitional excitation mode do not require a charged battery (e.g. but can optionally use a charged battery to increase the ramp up or rise rate versus time in the direct current voltage bus during the transitional excitation mode) to excite the induction machine 55 in preparation for the operational mode. In practice, the electronic data processing system 100 or driver controller may issue an excitation complete signal or status message to switch from the start-up mode to the operational mode.

Figure 4:
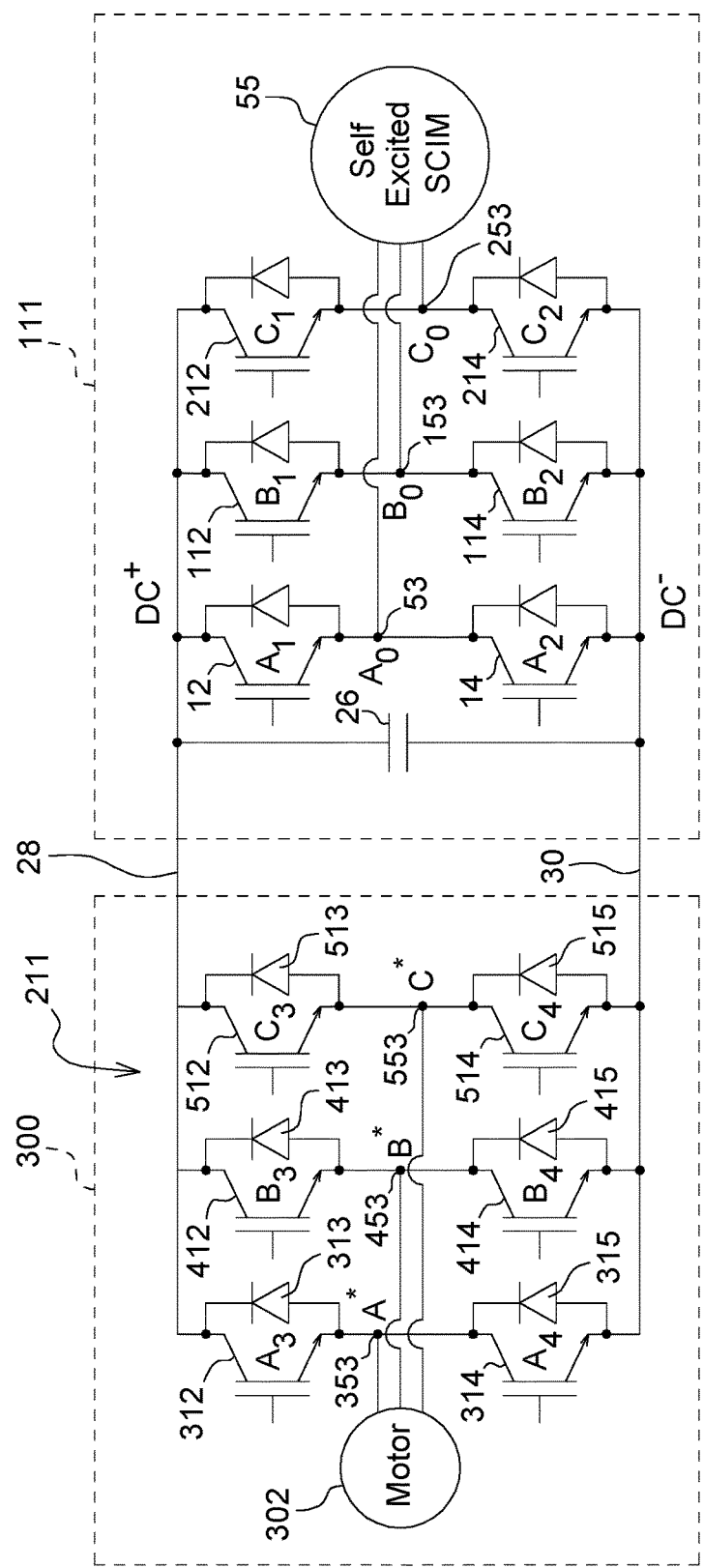
FIG. 4 is yet another embodiment of a schematic representation of an inverter system that is connected to an induction generator, an active load that comprises a secondary inverter and an electric motor.

FIG. 4 is yet another embodiment of a schematic representation of an inverter system 111 that is connected to an induction generator 55, an active load 300 that comprises a secondary inverter 211 and an electric motor 302. The system of FIG. 4 is similar to the system of FIG. 3A, except the system of FIG. 4 has no resistive load and no disconnect switch associated with the load. Like reference numbers in FIG. 2, FIG. 3A, and FIG. 4 indicate like elements or features. The description of FIG. 3A and FIG. 3B apply to FIG. 4, except for the references to the resistive load 306, the battery 304, and the disconnect switch 303 as if fully set forth in conjunction with FIG. 4.

Figure 5A:
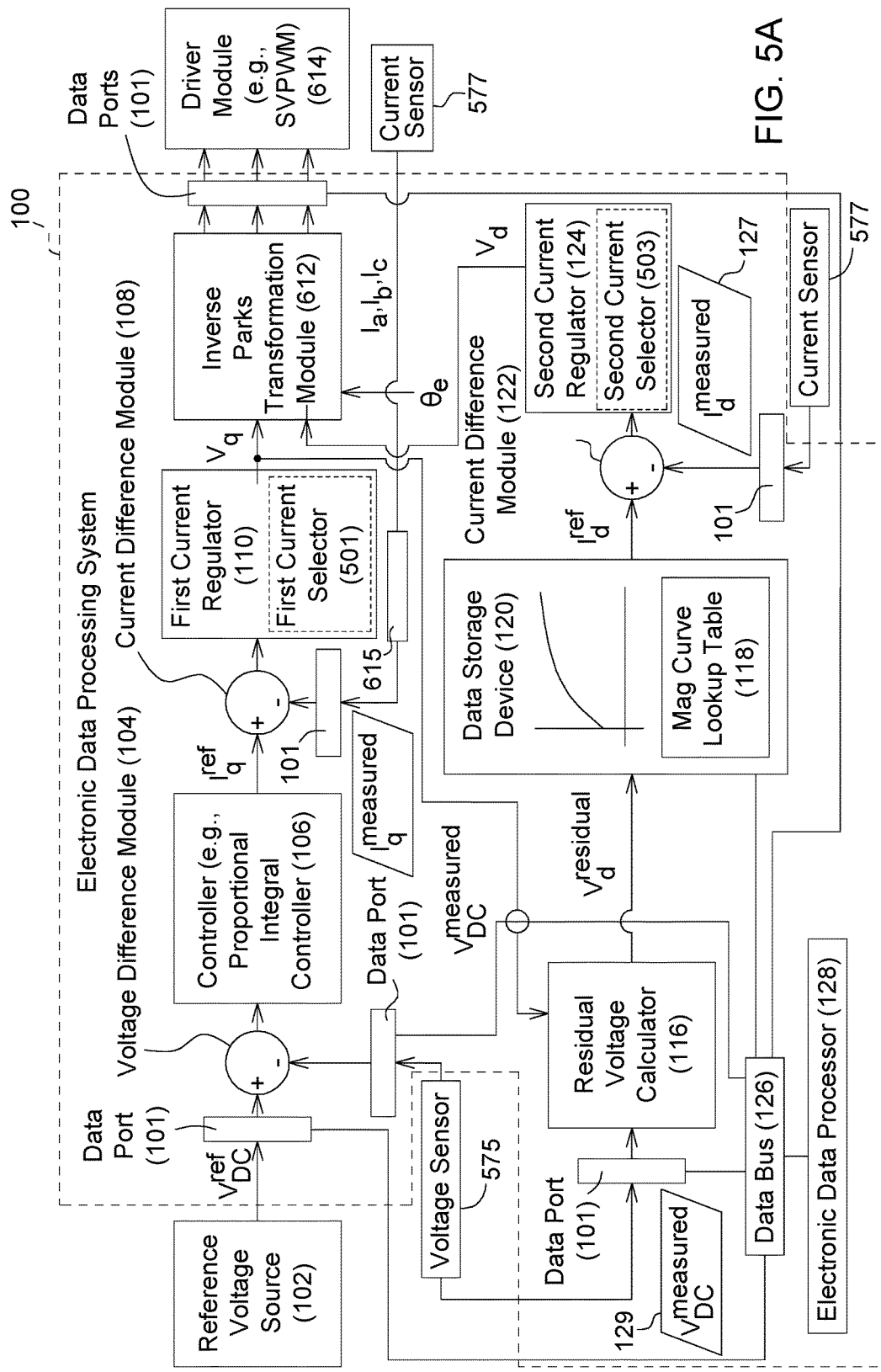
FIG. 5A is a block diagram that illustrates one possible embodiment of the modules (e.g., software) associated with the driver or controller for the driver.

FIG. 5A is a block diagram that illustrates one possible embodiment of the modules associated with the electronic data processing system 100 for controlling the driver module 614 and/or the drivers (18, 118, 218) for the inverter system 111, 211 or both. As used throughout this document, a module or component may refer to software, hardware or both. The lines that interconnect the modules may represent physical transmission lines, or virtual communications or relationships between modules. For example, physical transmission lines include wires, cables, coaxial cables, conductive traces on circuit boards, or other conductors; whereas virtual communications may refer to communications of data, such as calls, between software or other data structures. Software shall mean software instructions, data files, databases, look-up tables, equations, curves, mathematical relationships, logic relationships, and other data structures for storing data.

As used throughout this document, configured to, adapted to, and arranged to shall be considered synonymous and shall mean any of the following: (a) programmed or equipped with software instructions, logic or data structures to accomplish a specified function, process, determination, or result, or (b) equipped with hardware, circuits or electronics to accomplish a function, process, determination, or result, or (c) capable of performing a function, process or calculation while the system or inverter is working or operational.

In one embodiment, the electronic data processing system 100 comprises an electronic data processor 128, a data storage device 120 and one or more data ports 101 coupled to a data bus 126. The data storage device 120 may store, retrieve, read and write data with respect to one or more modules or components illustrated in FIG. 5A. FIG. 5A is merely one possible illustrative representation of the software modules, look-up tables, and data processing system 100 that can be used to implement an embodiment of the system and method disclosed in this document, and other configurations or data processing systems are possible.

The electronic data processor 128 may comprise a processor, a microcontroller, a digital signal processor, an application specific integrated circuit (ASIC), a programmable logic array, a programmable logic device, field programmable gate array (FPGA), a logic circuit, an arithmetic logic unit, a Boolean logic device, or another data processing device. Any of the software modules, look-up tables or data structures, mathematical operations, transformations, controllers, or other blocks referenced in FIG. 5A or elsewhere this disclosure may be realized by the data processor 128, alone or in combination with the data storage device 120. For example, the data processor 128 may process or manipulate data, algorithms and software instructions stored in registers or accessed by the data processor 128 in the data storage device 120 to carry out the functions, controllers, calculators, selectors, or modules described in this document.

Each data port 101 may comprise a data transceiver, buffer memory, or both.

The data storage device 120 may comprise one or more of the following: electronic memory, nonvolatile electronic memory, an optical data storage device, a magnetic data storage device, or other device for storing digital or analog data.

In one embodiment, the driver controller comprises an electronic data processing system 100 for controlling an inverter (11, 111 or 211), such as an inverter coupled to an induction machine (e.g., 55) or induction generator.

A voltage sensor 575 is configured to measure an observed voltage across the direct current voltage terminals (28, 30) (e.g., DC bus). For example, the voltage sensor 575 provides an observed voltage to the electronic data processing system 100 via a data port 101. A reference voltage source 102 provides a reference DC bus voltage. For example, the reference voltage source 102 provides the reference DC bus voltage to the electronic data processing system 100 via a data port 101. In one embodiment, the reference voltage source 102 may comprise a comparator, an operational amplifier or a voltage regulator circuit (e.g., such as a ramped reference signal versus time).

A voltage difference module 104 is configured to determine a voltage difference (e.g., voltage bus error) between the observed voltage (of the voltage sensor 575) and a reference DC bus voltage. The voltage difference module 104 outputs or provides the voltage difference between the observed voltage and the reference DC bus voltage to a controller 106.

A controller 106, such as a proportional integral (PI) controller 106, is adapted to generate a reference quadrature-axis (q-axis) current command ($I_q^{ref}$) based on the voltage difference between the observed voltage and the reference DC bus voltage (e.g., at terminals 28, 30) to a controller 106.

A current sensor 577 can measure one or more phase currents that relate to a q-axis current ($I_q^{measured}$). In one embodiment, a current sensor 577 is coupled to a data port 101; the current sensor 577 facilitates the provision of a measured q-axis current to the electronic data processing system 100. For example, one or more current sensors 577 measure current for each phase of the induction machine 55, such as $I_a$, $I_b$, and $I_c$, where the inputs of a Parks transformation module 615 is coupled to an output of each current sensor 577 such that the Parks transformation module 615 transforms the measured currents into a measured q-axis current, or into a measured q-axis current and a measured d-axis current.

A current difference module 108 is adapted to determine a current difference (e.g., q-axis current error) between the measured q-axis command current and the reference q-axis current command ($I_q^{ref}$).

A first current regulator 110 is configured to output a q-axis voltage command ($V_q$) (or its equivalent q-axis current command) based on an input of the current difference between the measured q-axis command current and the reference q-axis current command ($I_q^{ref}$). The first current regulator 110 provides the q-axis voltage command ($V_q$) (or its equivalent q-axis current command) to the Inverse Parks transformation module 612 and the residual voltage calculator 116. The inverse Parks transformation module 112 uses the q-axis voltage command (or its equivalent q-axis current command), the measured rotor position and slip angle to provide appropriate control signals to the driver module 614. In one embodiment, the driver module 614 has output terminals for controlling the inverter switches (e.g., 12, 112, 212, 14, 114, 214). For example, the output terminals of the driver module 614 are coupled to the phase drivers (18, 118, 218) or to the control terminals (50, 150, 250, 52, 152, 252).

Residual voltage is the alternating current output at one or more phase output terminals of the induction machine 55 that persists and decays during a transient time period after direct current voltage excitation of the direct current bus is turned off. However, during operation of the induction machine (e.g., application of rotational energy to the machine's rotor) the residual voltage and the associated electromagnetic fields in the electric machine can contribute toward the excitation of the induction machine 55 in the transitional excitation mode. Residual direct-axis voltage is a transformation (e.g., Parks transformation) that represents the alternating current residual current in simplified form for computation. In one embodiment, the data processor 128 is programmed with software instructions or otherwise adapted to inflate the residual direct-axis current to increase the robustness of an excitation process of the electromagnetic field in the one or more windings and the associated increase in direct current voltage.

An electronic data processor 128 or residual voltage calculator 116 determines a direct-axis (d-axis) residual voltage ($V_d^{residual}$) based on the q-axis voltage command and an observed voltage across the direct current voltage terminals (28, 30) (e.g., DC bus). For example, the data processor 128 or residual voltage calculator 116 determines a d-axis residual voltage ($V_d^{residual}$) in accordance with the following equation (e.g., to fully use the DC bus and facilitate robust, reliable self-excitation of the windings of the induction machine):

$$V_d^{residual} = \sqrt{\frac{(mV_{DC}^{measured})^2}{3} - V_q^2};$$

where
$V_d^{residual}$ is the residual direct-axis voltage;
m is the modulation index;
$V_{DC}^{measured}$ is the measured voltage of or between the direct current terminals; and
$V_q$ is the quadrature-axis voltage command.

The data processor 128 is adapted to determine d-axis reference current ($I_d^{ref}$) for a corresponding residual d-axis voltage ($V_d^{residual}$) based on a magnetizing curve or K-factor lookup table 118 stored in a data storage device 120. The data associated with the magnetizing curve or K factor lookup table 118 will typically vary based on the characteristics and design of the respective induction machine or particular induction generator.

In an alternate embodiment, the magnetizing curve or K-factor lookup table 118 may be represented as one or more quadratic equations, graphical curves, data files, inverted files, or otherwise.

A current difference module 122 is adapted to determining an electrical current difference (e.g., d-axis current error) between the measured d-axis command current (e.g., observed d-axis current) and the reference d-axis current command ($I_d^{ref}$). The current difference module 122 provides the current difference (e.g., d-axis current error) to a second current regulator 124.

The second current regulator 124 (e.g., complex vector current regulator) is adapted to determine the commanded d-axis voltage ($V_d$) based on the current difference (e.g., d-axis current error) or the measured d-axis current ($I_d^{measure}$) and the determined d-axis reference current ($I_d^{ref}$).

In one embodiment, an inverse Parks transformation module 612 can provide or provides phase voltage commands ($V_a, V_b, V_c$) based on inverse parks transform of the commanded voltages ($V_d$ and $V_q$). For example, the inverse Parks transformation module 612 can provide or provides phase voltage commands ($V_a, V_b, V_c$) based on inverse parks transform of the commanded voltages ($V_d$ and $V_q$) and the electrical angular position of the rotor ($\theta_e$) of the induction machine 55 or generator. In particular, the Parks transformation module can use the following equation of the rotor field orientation to provide phase voltage commands ($V_a, V_b, V_c$):

$$\theta_e = \theta_{rotor} = \int \omega_{slip} dt,$$

where $\theta_e$ is the electrical angular position of the rotor;
where $\theta_{rotor}$ is the mechanical angular position of the rotor;
and $\omega_{slip}$ is the angular slip velocity of the rotor.

In certain embodiments, the sensor, such as a resolver encoder, can estimate or measure mechanical angular position of the rotor. In other embodiments, such as the configuration illustrated in FIG. 5A, a sensor-less position estimator can be used to estimate the mechanical angular position of the rotor from current measurements by one or more current sensors 577 that measure current of one or more phases of the alternating current output of the induction machine 55. The inverse Parks transformation module 612 can provide the output of one or more phase voltage commands to driver module 614 or one or more drivers (18, 118, 218) associated with an inverter. Typically, the output of the voltage commands are consistent with pulse-width modulation or space-vector pulse width modulation of the switching transistors of the inverter (11, 111, 211).

Figure 5B:
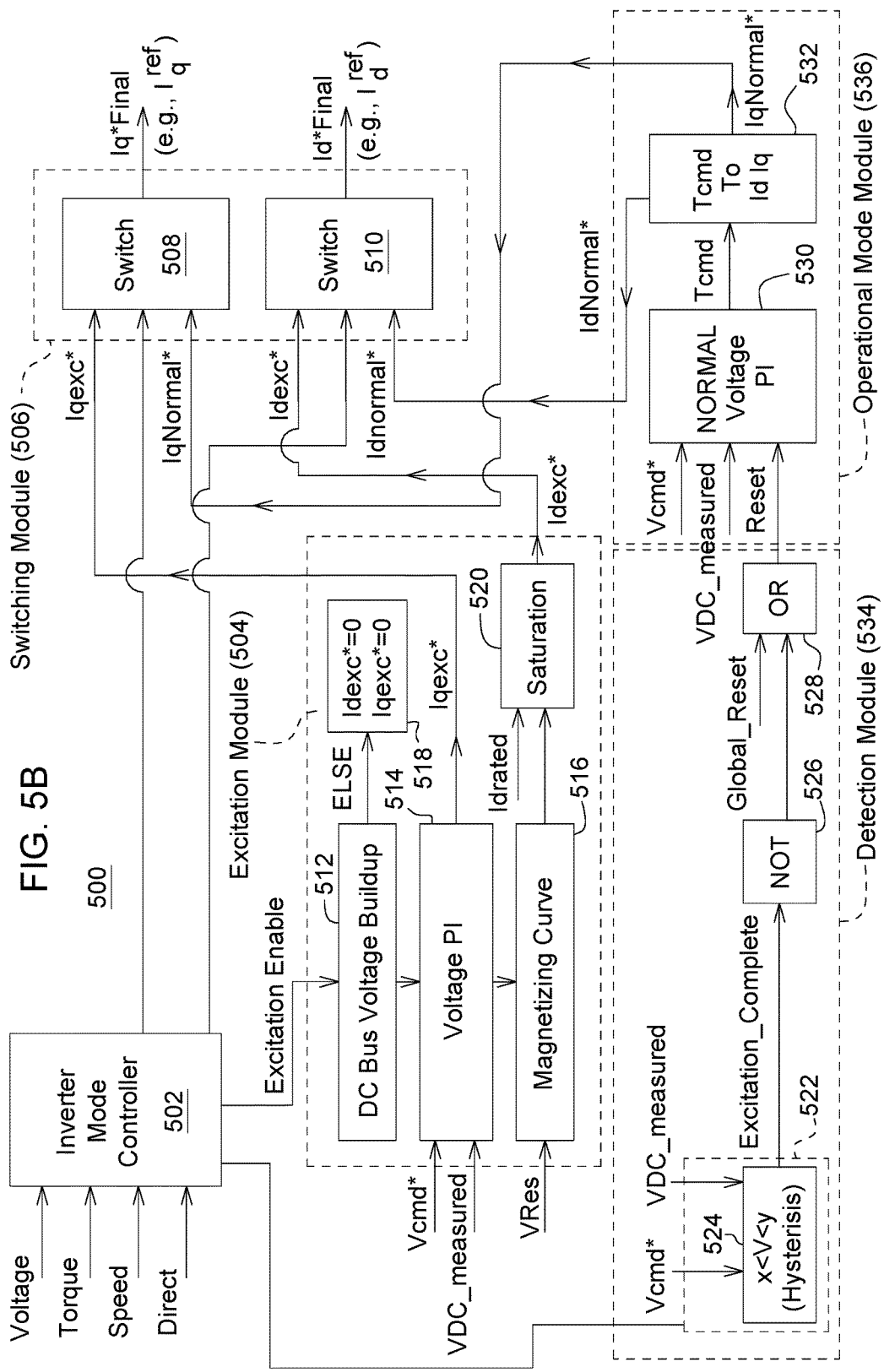
FIG. 5B is a block diagram that one possible embodiment of the logic or modules (e.g., software) for controlling a mode of operation of an inverter.

FIG. 5B is a block diagram of one possible embodiment of a system 500 for controlling a mode of operation of an inverter (11, 111, 211).

In one embodiment, the system 500 may be incorporated into the data processing system 100 of FIG. 5A or the system 500 may comprise software, instructions or data structures that reside in the data processing system 100 of FIG. 5A. For example, the system 500 may be realized by or implemented by the data processor 128 operating in conjunction with the data bus 126, data storage device 120, and other blocks in FIG. 5A.

In some embodiments, the output of final direct-axis current command ($I_d^{*Final}$) in FIG. 5B can be used as the reference direct-axis current ($I_d^{Ref}$) in FIG. 5A; the output of the final quadrature-axis current command ($I_q^{*Final}$) in FIG. 5B can be used as the reference quadrature-axis current ($I_q^{Ref}$) in FIG. 5B. The voltage proportional integral controller 514 of FIG. 5B is analogous to or a variant of the controller 106 of FIG. 5A; the mag curve look-up table 118 of FIG. 5A is analogous to or a variant of the magnetizing curve 516 of FIG. 5B.

In FIG. 5B, one or more of the following modules can communicate with each other: the inverter mode controller 502, the excitation module 504, the switching module 506, the detection module 534, and the operational mode module 536. The lines that connect the blocks or modules in FIG. 5A and FIG. 5B represent virtual communication lines, physical communication lines, or both, where physical communication lines may represent transmission lines, conductors, or cables, or wireless communication channels, and where virtual communication lines may be communications of data via data bus, calls or data messages in a software program.

The inverter mode controller 502 can operate or control an inverter (11, 11, 211) in accordance with one or more of the following operational modes: voltage control mode, torque command control mode, speed control mode, and direct control mode. Further, the inverter mode controller 502 supports the start-up mode, the transitional excitation mode, and the operational mode, and optionally the hand-off mode (e.g., hysteresis mode). The hand-off mode is an optional transition mode between the transitional excitation mode and the operational modes. For example, the hand-off mode can assure that excitation in the transitional excitation mode is complete prior to entry into the operational mode in which the inverter and induction machine can be permitted to receive a full load that might otherwise be disruptive to completion of the transitional excitation mode and attainment of the full operational direct current bus voltage. In the hand-off mode, the data processor 128 or a timer may determine that the excitation is complete and has reached the target operational direct current voltage by a hysteresis algorithm or by a timer (or data processor) that is triggered when the target operational direct current voltage meets or exceeds a threshold voltage for at least a minimum time period (e.g., defined by a duration of one or more sampling intervals).

For operation in the operational mode, the mode controller 502 disables the excitation module 504 (e.g., via the excitation enable signal) and the detection module 534 and enables the operational mode module 536. In one embodiment, the inverter mode controller 502 determines that states of one or more switches (508, 510) in the switching module 506 to select the final quadrature-axis current command ($I_q^{*Final}$) and the final direct-axis current command ($I_d^{*Final}$) from inputs of the excitation direct-axis current command ($I_d^{exc*}$), the normal direct-axis current command ($I_{dnormal*}$) the excitation quadrature-axis current command ($I_q^{exc*}$), the normal quadrature-axis current command ($I_{qnormal*}$), and operational mode data.

During the excitation of the induction machine (55) in a start-up mode or in the transitional excitation mode, the data processing system (100, 500) or the inverter mode controller 502 controls one or more switches (508, 510) to output an excitation direct-axis current command ($I_d^{exc*}$) and an excitation quadrature-axis current command ($I_q^{exc*}$) from the excitation module 504 as the final direct-axis current command ($I_d^{*Final}$) and the final quadrature-axis current command ($I_q^{*Final}$), respectively. Similarly, after the excitation and during the operational mode, the data processing system (100, 500) or inverter mode controller 502 controls one or more switches (508, 510) to output a normal direct-axis current command ($I_{dnormal*}$) and a normal quadrature-axis current command ($I_{qnormal*}$) as the final direct-axis current command ($I_d^{*Final}$) and the final quadrature-axis current command ($I_q^{*Final}$), respectively, which depends upon selection of the operational mode (e.g., voltage, torque, speed or direct control modes).

During the excitation, the data processing system (100, 500) operates in accordance with FIG. 5A, where a variant is summarized in the excitation module 504 of FIG. 5B. The excitation module 504 receives the inputs of: (a) the commanded voltage (Vcmd*), which is composed of direct-axis voltage and quadrature-axis voltage; (b) direct current voltage (VDC_measured) of the direct current data bus, and (c) the direct-axis residual voltage (VRes). The excitation module 504 outputs an excitation direct-axis current command ($I_d^{exe*}$) and an excitation quadrature-axis current command ($I_q^{exc*}$) based on DC bus voltage build-up module 512, a voltage proportional integral controller 514 and a magnetizing curve 516. In particular, the DC bus voltage buildup module 512 controls the an excitation direct-axis current command ($I_d^{exc*}$) and an excitation quadrature-axis current command ($I_q^{exc*}$) during the start-up mode and the transitional excitation mode to increase or ramp up the direct current voltage on the capacitor 26 or across the direct current bus of the inverter. Further, the magnetizing curve 516 is used to derive the direct-axis reference current, which can be modified by the saturation module 520 (e.g., by a rate factor, $I_{drated}$) to enhance the increase or ramp-up of the voltage of the direct current bus of the inverter in accordance with one or more target slopes or slew rates (e.g., that are matched or optimized for winding inductances, target rotor speed range and other parameters of a corresponding induction machine 55).

After the excitation and during the operational mode, the data processing system (100, 500) or the detection module 534 recognizes that the excitation is complete by evaluating the direct current bus voltage with respect to the target direct current voltage, or the stop set voltage plus a tolerance, as described in this document. In accordance with one embodiment of a hysteresis algorithm, the detection module 534 comprises a hand-off module 524 (e.g., hysteresis module) to determine whether the measured direct current bus voltage is equal to or greater than a voltage threshold (e.g., stop set voltage plus a tolerance for one or more sampling periods) indicative of complete excitation of the windings of the induction machine (55). If the detection module 534 or the hand-off module 524 determines that the excitation is complete because the voltage threshold is satisfied for a minimum time period, the hand-off module 524 generates an excitation complete signal or data message, which may be inputted to one or more Boolean logic blocks (526, 528), such as the NOT device 526 and the OR device 528.

If the excitation is complete, the data processing system (100, 500) or inverter control module 502 activates the operational mode module 536 and enters into the operational mode where the normal direct-axis current command ($I_{dnormal*}$) and a normal quadrature-axis current command ($I_{dnormal*}$) are outputted by a torque command module 532. For example, the normal voltage proportional integral controller 530 can use a commanded voltage (Vcmd*) or torque command, a measured direct current voltage (VDC_measured), and an enable or reset input (Reset) to control the selection of or the operational mode (e.g., to develop normal direct-axis and quadrature-axis currents based on a torque command). During the operational mode, the excitation module 504 is disabled or the excitation direct-axis current command ($I_d^{exe*}$) and an excitation quadrature-axis current command ($I_q^{exc*}$) are set equal to zero as reflected in block 518. For example, the normal voltage proportional integral controller 530 may be implemented in accordance with FIG. 5A in which the controller 106 and current regulator 124 can carry out the functions of controller 530.

In one embodiment, the torque command module 532 determines direct-axis and quadrature-axis currents based on torque command generated by a user or software of the induction machine and whether the rotor of the induction machine is operating at or below a baseline speed or velocity, such that the normal direct-axis current command and a normal quadrature-axis current command are outputted to target the baseline speed or velocity with minimal error.

FIG. 6A is a chart that represents one embodiment of the ramping or increasing of the direct current excitation voltage in the capacitor 26 versus time, or across the DC bus terminals (28, 30), during the start-up mode or during the start-up mode and during the transition between the start-up and the operational mode, among other things. For instance, the chart of FIG. 6A may represent actual experimental results of an inverter that is self-excited to operate an induction machine 55. The horizontal axis 602 of FIG. 6A represents time, the vertical axis (601, 600) represents signal magnitude (in accordance with the corresponding scales on the right or left of the chart). As shown, the left vertical scale 601 represents volts direct current on the direct current bus of the inverter (e.g., inverter system 111), whereas the right vertical scale 600 represents direct-axis current divided by quadrature-axis current, which can be expressed as a unitless ratio.

As illustrated in FIG. 6A, the DC bus voltage 606 on the direct current voltage terminals (28, 30) ramps up from the start-up voltage to a peak operational voltage or target direct current operational voltage, such as 600 Volts or greater on the direct current bus or the direct current voltage terminals (28, 30). In the transitional excitation mode of FIG. 6A (e.g., between approximately 0.1 seconds and 1 second of the horizontal axis 602), the direct current ramps up to a target operational direct current voltage at a generally fixed slope or is slewed appropriate to ensure correct operation, although multiple ramp up rates, slopes, or slew rates are possible. Although FIG. 6A illustrates a peak operational voltage 607 of approximately 700 volts (direct current), the actual voltage depends upon design choices and factors and the 700 volts level is merely one possible illustrative example.

FIG. 6A also illustrates: (1) the corresponding commanded direct-axis current curve 605, labeled $I_d^{command}$, and indicated by alternating long and short dashed lines; (2) the corresponding quadrature-axis current curve 603, labeled $I_q^{command}$, and indicated by dashed lines; (3) the DC bus voltage 606, indicated by a solid line, and (4) the slewed direct current bus command 604, indicated by the long dashed lines, which is generally coextensive with the DC bus voltage 606, as illustrated, and is associated with the operation of the induction generator in combination with the inverter.

FIG. 6B is an illustrative chart that represents another possible waveform in the ramping up of the excitation voltage in the capacitor versus time during the start-up mode, transitional excitation mode and the operational mode, among other things. In FIG. 6B, the horizontal axis 650 represents time (e.g., in seconds) and the vertical axis 652 represents actual direct current voltage ($V_{DC}^{actual}$) on the direct current bus.

A start-up mode is associated with a first time period, $T_1$, 654; a transitional excitation mode is associated with a second time period, $T_2$, 656; and an optional hand-off mode (e.g., hysteresis mode) is associated with a third time period, $T_3$, 658, and an operational mode is associated with a fourth time period, $T_4$, 660. Although the second time period, $T_2$, 656, or the transitional excitation time period has two generally linear slopes (662, 664) in FIG. 6B, which are labeled first slope $m_1$ (662) and second slope $m_2$ (664), the slope (662, 664) may be characterized as single slope or a curved slope in alternate embodiments. The first slope represents rise or increase (e.g., first rate of rise) in the direct current bus voltage over time in the transitional excitation mode; the second slope represents a rise or increase (e.g., second rate of rise) in the direct current bus voltage over time in the transitional excitation mode. For example, the direct current bus voltage increases a rate of a first slope between the primary voltage level and the secondary voltage level, where the data processor 128 can control (or is adapted to control, implement or achieve) the first slope by a first combination of commanded quadrature-axis current and a commanded direct-axis current of the electric machine (e.g. in accordance with software instructions stored in the data storage device). Similarly, the data processor 128 can control (or is adapted to control, implement or achieve) a direct current bus voltage that increases at a rate of the second slope between the primary voltage level or an intermediate voltage level and the secondary voltage level, where the intermediate voltage level is between the primary voltage level and the secondary voltage (e.g. in accordance with software instructions stored in the data storage device); the data processor 128 controls, implements or achieves the second slope by the second combination of commanded quadrature-axis current and an commanded direct-axis current (e.g., inflated commanded direct-axis current with respect to the commanded direct axis current for the first slope) of the electric machine.

As illustrated, a second slope, $m_2$, 664 may exceed the first slope, $m_1$, to reduce the total time or elapsed time from start-up mode during the first time period 654 (or inverter initialization or turn-on) to achieve the full operational target direct current voltage at the fourth time period 660. The first slope $m_1$ 662 (e.g., lower slope) may be achieved by a first combination of commanded quadrature-axis current (e.g., torque producing current) and a commanded direct-axis current (e.g., field producing current) and the second slope $m_2$ 664 (e.g., greater slope than the lower slope) may be achieved by the second combination of commanded quadrature-axis current (e.g., torque producing current) and a commanded direct-axis current (e.g., inflated commanded direct-axis current or inflated field producing current). In one example, the data processor 128 inflates the commanded direct-axis current of the second combination (e.g., by adjustment of the reference direct-axis current via a mathematical relationship or magnetic curve look-up table 118 or otherwise) with respect to the commanded quadrature-axis current of the first combination. In another example, for the first slope, the second slope or both, a second current regulator 124 or data processor 128 determines a commanded direct-axis (d-axis) voltage ($V_d$) based on a measured d-axis current ($I_d^{measured}$) and a determined or adjusted (e.g., inflated) d-axis reference current ($I_d^{ref}$) derived from a mathematical relationship between d-axis residual voltage ($V_d^{residual}$), the observed direct current bus voltage ($V_{DC}^{measured}$) and the commanded q-axis voltage ($V_q$) in which residual voltage is proportional to a mathematical function of the measured, observed direct current voltage ($V_{DC}^{measured}$) and the commanded q-axis voltage ($V_q$). In another example, the mathematical relationship is defined by a magnetic curve look-up table 118 that characterizes the electric machine or induction machine.

The inflation of the commanded direct-axis current or voltage may reduce the time period, $T_2$ (656), of the transitional excitation mode such that the operational mode (e.g., $T_4$) is time-shifted to begin rapidly with an accompanying reduction in the time period $T_2$ (656) of the transitional excitation mode; hence, any applicable load 300 can be connected or energized in a responsive, real-time manner to the direct current bus of the inverter system, such as for hybrid vehicle operation where responsive acceleration or torque is required from an active load 300 of a motor 302 connected to the direct current bus (28, 30).

In FIG. 6B, although the start-up mode is characterized by the direct current voltage across the capacitor 26 or direct current bus increasing rapidly followed by a knee or plateau at a an initial start-up voltage (level), a preliminary voltage, or initial voltage level 665 (e.g., $V^1_{DC}$) 665; the data processor 128, the data processing system 100, or the trickle charging of one or more power supplies (22, 24, 12, 124, 222, 224) may facilitate other curved or substantially linear increases in the direct current voltage.

During the third time period, the hand-off mode (e.g., hysteresis mode) is characterized by a hand-off voltage (e.g., hysteresis voltage) or set stop voltage 667 (e.g., at $V^2_{DC}$) in which the data processor 128 or data processing system 100 monitors whether or not the direct current voltage bus exceeds the set stop voltage over one or more sampling intervals by a minimum voltage tolerance (e.g., 10 volts). In one embodiment, the target operation voltage may equal the set stop voltage plus the minimum voltage tolerance. If during the third time period $T_3$ (658) or the hand-off mode (e.g., hysteresis mode), the data processor 128 or data processing system 100 determines that the direct current voltage bus exceeds the set stop voltage over one or more sampling periods by a minimum voltage tolerance (or equals or exceeds the target direct current voltage), the data processor 128 or data processing system 100 switches to an operational mode, in which normal control of the induction machine 55 is commanded, such as voltage proportional integral control. For example, during the fourth time period $T_4$ (660) or in the operational mode, the data processor 128 may command or instruct the commanded direct-axis current and the commanded quadrature-axis current consistent with operation with a rated magnetizing current if the rotor of the induction machine 55 is below the baseline speed or with field weakening magnetizing current if the rotor of the induction machine 55 is above the baseline speed.

Figure 7:
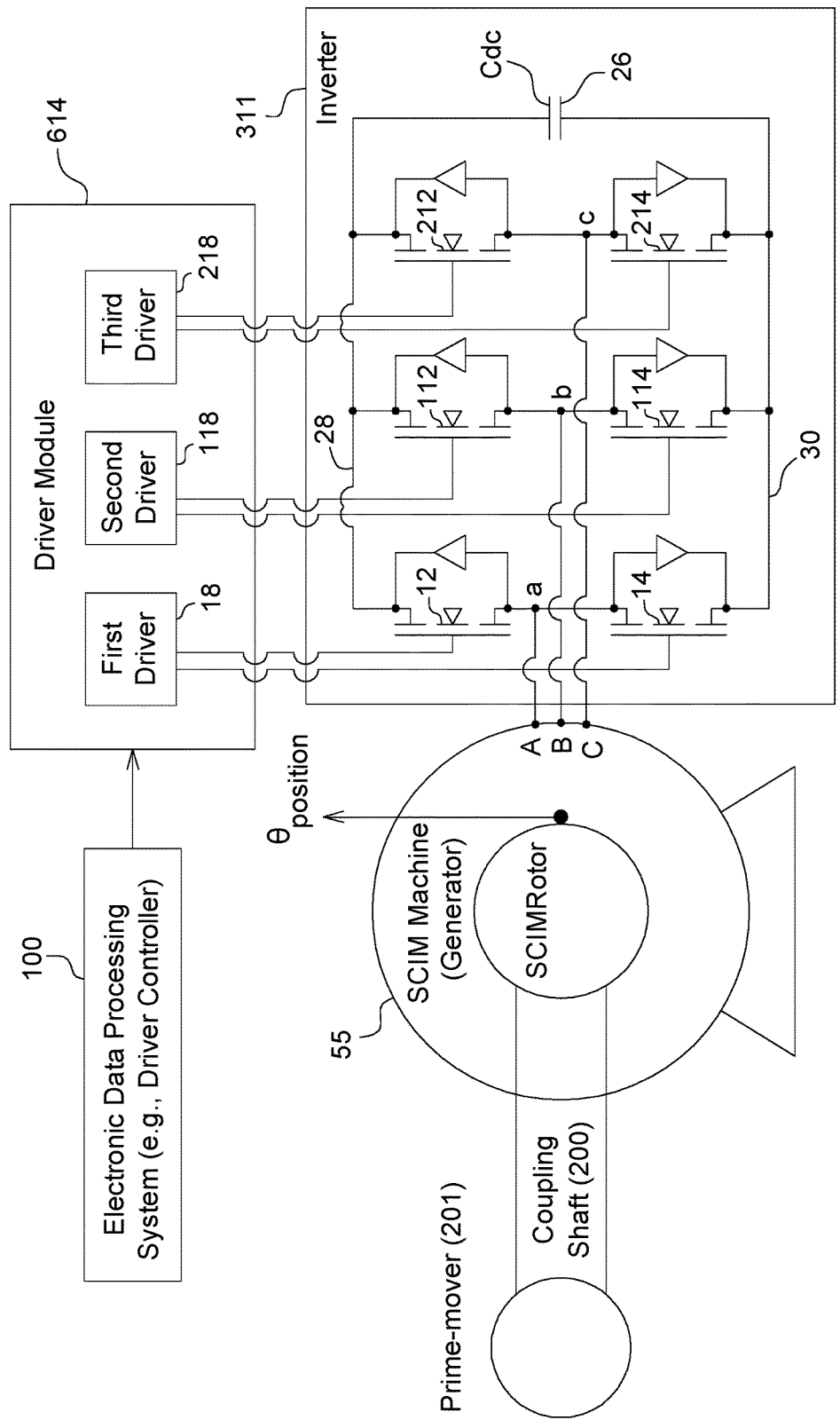
FIG. 7 is a block diagram that illustrates one possible configuration of the driver controller, the driver, the inverter, the induction machine and the prime mover, such as an internal combustion engine.

FIG. 7 is a block diagram that illustrates one possible configuration of the driver controller, the driver module 614, the inverter 311, the induction machine 55 and the prime mover 201, such as an internal combustion engine. Like reference numbers in FIG. 7 and any of the other drawings indicate like elements.

FIG. 7 shows one possible configuration of the driver module 614 that comprises a first phase driver 18, a second phase driver 118, and a third phase driver 218, consistent with FIG. 2. The electronic data processing system 100, such as that illustrated in FIG. 5A, can be used to control the driver module 614. The prime mover 201 or internal combustion engine provides rotational energy to the induction machine 55 by a coupling shaft 200. The induction machine 55 or generator converts the rotational energy into electrical energy in the operational mode after the start-up mode (e.g., weak pre-charge mode) in which the capacitor 26 across the direct current bus (28, 30) is trickle-charged to provide a start-up voltage sufficient to energize one or more windings of the induction machine 55. As illustrated the induction machine 55 comprises a squirrel cage induction machine 55, although any other suitable induction machine may be used. The inverter 311 is analogous to the inverter of FIG. 2, except that the switches (12, 112, 212, 14, 114, 214) are illustrated schematically as metal oxide field effect transistors.

Figure 8:
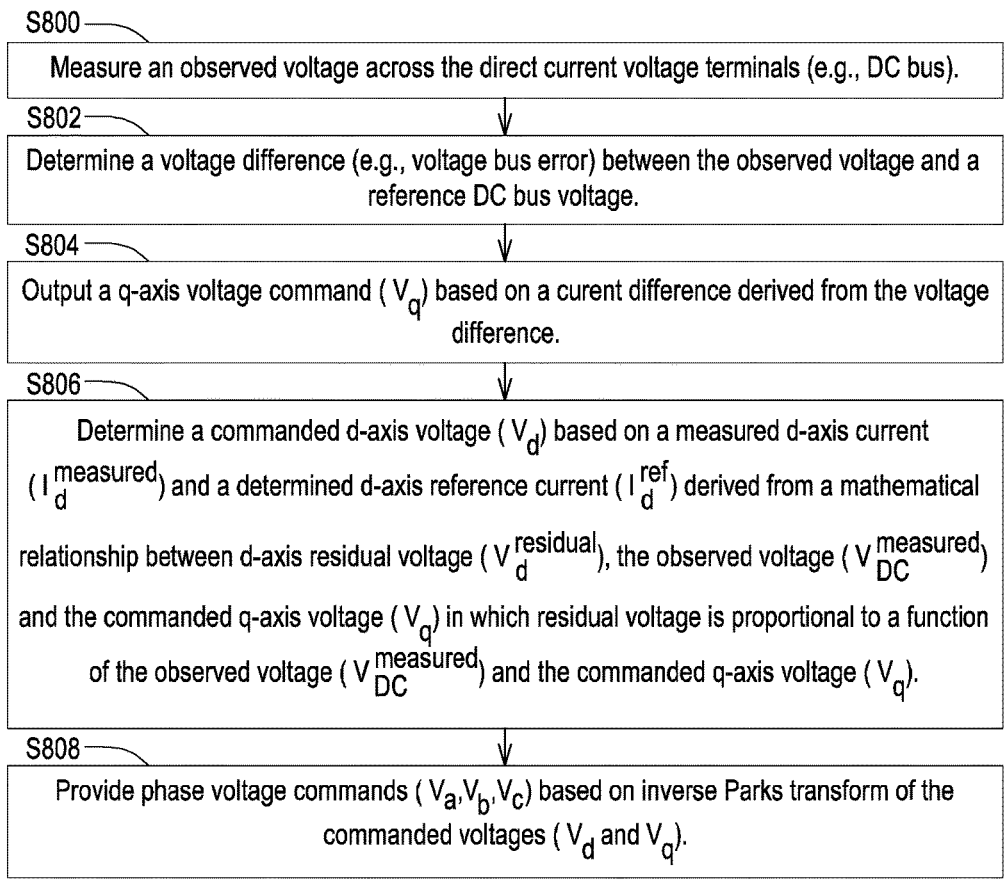
FIG. 8 is one embodiment of a flow chart of a method for a self-exciting of an induction machine.

FIG. 8 is one embodiment of a flow chart of a method for a self-exciting of an induction machine 55. The method of FIG. 8 begins in step S800.

In step S800, a voltage sensor 575 or inverter system (e.g., 11, 111, 211, 311) measures an observed voltage across the direct current voltage terminals (28, 30) (e.g., direct current (DC) bus).

In step S802, a voltage difference module 104, a summer, or data processor 128 determines a voltage difference (e.g., voltage bus error) between the observed voltage (from the voltage sensor 575) and a reference DC bus voltage.

In step S804, a first current regulator 110 or data processor 128 outputs a quadrature-axis (q-axis) voltage command ($V_q$) based on an electrical current difference derived from the voltage difference. For example, the electrical current difference is derived from the voltage difference between the measured, observed voltage ($V_{DC}^{measured}$) and a reference DC bus voltage ($V_{DC}^{ref}$), where a controller 106 (e.g., proportional integral controller) determines a quadrature reference current ($I_q^{ref}$) from the voltage difference and where a current difference module 108 determines a difference (e.g., electrical current difference or q-axis current error) between a quadrature reference current ($I_q^{ref}$) and a measured, observed quadrature current ($I_q^{measured}$) (e.g., measured q-axis command current) facilitated by current measurements of one or more current sensors 577 for input to the first current regulator 110. For example, a current sensor 577 can measure one or more phase currents that relate to a q-axis current ($I_q^{measured}$). In one embodiment, a current sensor 577 is coupled to a data port 101; the current sensor 577 facilitates the provision of a measured q-axis current to the electronic data processing system 100. For example, one or more current sensors 577 measure current for each phase, such as $I_a$, $I_b$, and $I_c$, where the inputs of a Parks transformation module 615 is coupled to an output of each current sensor 577 such that the Parks transformation module 615 transforms the measured currents into a measured q-axis current, or into a measured q-axis current ($I_q^{measured}$) and a measured d-axis current. In one embodiment of step S804, during the start-up mode, the controller 106, data processor 128, or proportional integral controller limits the magnitude of the change in signal amplitude over time in the quadrature reference current ($I_q^{ref}$) such that the capacitor ($C_{DC}$) 26 between the direct current voltage terminals (28, 30) has sufficient time to charge and store adequate electrical energy or to reach a critical direct current voltage level, such as a start-up voltage or primary voltage (e.g., a primary voltage level of approximately 20 VDC or greater) that can enable operation of the switches of the inverter system 111 or primary inverter. In one embodiment, the data processor 128 or proportional integral controller 106 may wait until the trickle charge of the capacitor 26 or the direct current bus is substantially complete or achieved the critical direct current voltage level before increasing the quadrature reference current ($I_q^{ref}$). For example, in one embodiment the controller 106 or data processor 128 may model the estimated charging time of the capacitor 26 to wait for a minimum time period to achieve the start-up voltage level prior to allowing a material or substantial increase in the in a quadrature reference current ($I_q^{ref}$) that is associated with a transition to the operational mode (e.g., electrical generation mode of the induction machine 55) of the inverter from the start-up mode (e.g., charging of the capacitor).

In step S806, a second current regulator 124 or data processor 128 determines a commanded direct-axis (d-axis) voltage ($V_d$) based on a measured d-axis current ($I_d^{measured}$) and a determined d-axis reference current ($I_d^{ref}$) derived from a mathematical relationship between d-axis residual voltage ($V_d^{residual}$), the observed voltage ($V_{DC}^{measured}$) and the commanded q-axis voltage ($V_q$) in which residual voltage is proportional to a mathematical function of the measured, observed voltage ($V_{DC}^{measured}$) and the commanded q-axis voltage ($V_q$). In one embodiment, the start-up mode encompasses weak pre-charging of the capacitor 26 or the direct current bus (e.g., defined by terminals 28, 30); once the pre-charging of the capacitor 26 or direct current bus is complete, the data processing system 100 can initiate the excitation scheme that activates the transitional excitation mode in which the excitation or self-excitation of the inverter system (111) or primary inverter occurs and the DC link voltage ramps up to the target operational direct current voltage in accordance with step S806. Both the start-up mode and the transitional excitation mode occur prior to the full operational mode, although in some sense the transitional excitation mode or excitation stage relates to start-up of the inverter prior to full operational switching capability because the available DC link voltage may be lower than a target voltage.

Step S806 may be carried out in accordance with various techniques, which may be applied separately or cumulatively in a combination or permutation for the start-up mode, the transitional excitation mode or both.

Under a first technique, in the start-upstage, the transitional excitation mode, or both the electronic data processing system 100, the data processor 128 or the second current regulator 124 selects commanded d-axis voltage ($V_d$) to provide or build up a higher DC link voltage (e.g., start-up direct current voltage or target direct current voltage) on the direct current terminals (e.g., direct current bus, 28, 30) for self-excitation for a corresponding commanded d-axis current than otherwise required during the operational mode (e.g., for a given torque and respective rotor speed or torque versus rotor speed for the induction machine 55), consistent with the mathematical relationship, for enhanced (e.g., reliable and consistent) self-excitation of one or more windings of the induction machine 55 or induction generator.

Under a second technique, during the start-up stage, the transitional excitation mode or both, the electronic data processing system 100, the data processor 128 or the second current regulator 124 determines a d-axis residual voltage ($V_d^{residual}$) in accordance with the following equation (to fully use the DC bus and make the self-excitation of the windings of the induction machine robust consistent with ramping up the DC link voltage to a start-up direct current voltage or a target direct current voltage):

$$V_d^{residual} = \sqrt{\frac{(mV_{DC}^{measured})^2}{3} - V_q^2} \; ;$$

where:
$V_d^{residual}$ is the residual direct-axis voltage;
m is the modulation index;
$V_{DC}^{measured}$ DC is the measured voltage of or between the direct current terminals; and $V_q$ is the quadrature-axis voltage command. In one example, the modulation index has a value within a range of zero to approximately one. In another other example, the modulation index is within a range of approximately 0.9 to approximately 0.95.

Under a third technique, in the transitional excitation mode the data processor 128 or electronic data processing system 100 uses the d-axis residual voltage ($V_d^{residual}$) to inflate the reference d-axis current command ($I_d^{ref}$) above its normal value (e.g., based on control look-up tables or characteristic data for particular corresponding induction machines) for the reference d-axis current command for the respective performance characteristics or specifications of the particular induction machine 55 or induction generator. In turn, the inflated reference d-axis current command ($I_d^{ref}$) causes a greater difference (e.g., error) between the measured d-axis current ($I_d^{measured}$) and the inflated d-axis reference current ($I_d^{ref}$) as input to the second current regulator 124 that outputs the commanded d-axis current consistent with ramping up the DC link voltage to a start-up direct current voltage or a target direct current voltage. The data processor 128 is adapted to or programmed with software instructions to inflate a commanded direct-axis current via a magnetic curve look-up table (118) of a corresponding induction machine (55) with respect to the commanded quadrature-axis current to reduce a time period of a transitional excitation mode such that an operational mode is time-shifted to begin rapidly with an accompanying reduction in the time period of transitional excitation mode. Accordingly, the third technique can reduce the duration of the transitional excitation mode to enhance responsiveness (e.g., available torque and acceleration response) of a hybrid vehicle, where the load 300 on the direct current bus (28, 30) comprises a motor 302 of a vehicle.

Under a fourth technique, after the start-up mode, during the start-up stage, or during the transitional excitation mode the electronic data processing system 100 or the data processor 128 selects the direct-axis voltage command to be equal to or greater than a threshold direct current link voltage (e.g., target start-up direct current voltage) of or between the direct current terminals. For example, after the start-up mode or during the transitional excitation mode the threshold direct current link voltage may be within a range of approximately thirty volts direct current to approximately one hundred and fifty volts direct current, where approximately means about, generally or a margin or tolerance of plus or minus ten percent. However, after the start-up mode, after the transitional excitation mode, and during the normal operational mode of the inverter, the electronic data processing system 100 and data processor 128 transitions to or uses normal voltage and modulation index control (e.g., for pulse width switching) of the inverter switches.

Under a fifth technique, the data processor 128 or electronic data processing system 100 supports setting or storing of a transition direct current voltage level or start-up voltage level (e.g., direct current link voltage) of the observed direct current voltage to transition between the start-up mode and the operational mode, or to transition from the transitional excitation mode to the operational mode. For instance, the transition direct current voltage level, start-up voltage level, and the target direct current voltage may comprise a factory programmable, user-definable, or otherwise programmable values. The inverter begins at transitional excitation mode or excitation stage once the start-up voltage level of the direct current bus is reached (e.g., at the end of $T_1$). The inverter ends the transitional excitation mode (of $T_2$) or the excitation mode when the target direct current voltage of the direct current bus is achieved (at $T_3$ or $T_4$).

Under a sixth technique, the data processor 128 or electronic data processing system 100 determines the d-axis reference current ($I_d^{ref}$) for a corresponding residual d-axis voltage ($V_d^{residual}$) based on a magnetizing curve or K-factor look-up table stored in a data storage device 120. This d-axis reference current is determined by characterizing the induction machine 55 in the lab or field tests, by obtaining specifications from a manufacturer or designer of the induction machine 55, or by other empirical or statistical studies of a set of particular induction machine 55s. An accurate magnetizing curve for a corresponding induction machine 55 can be critical for successful self-excitation starting from a very low start-up voltage on DC voltage terminals or DC bus terminals.

In step S808, a data processor 128 or an inverse Parks transformation module 612 provides phase voltage commands ($V_a, V_b, V_c$) based on inverse Parks transform or a similar transformation of the commanded voltages ($V_d$ and $V_q$). For example, the data processor 128 or inverse Parks transformation module 612 may determine the Parks transformation or a similar transformation in accordance with using the position based on the following equation of the rotor field orientation:

$$\theta_e = \theta_{rotor} - \int \omega_{slip} dt,$$

where $\theta_e$ is the electrical angular position of the rotor;

where $\theta_{rotor}$ is the mechanical angular position of the rotor;

and $\omega_{slip}$ is the angular slip velocity of the rotor.

The angular slip velocity of the rotor ($\omega_{slip}$) is the control variable. The controller 106 or data processor 128 commands the correct operation of the slip point of the angular slip velocity using d and q axes current control. In particular, the reference d-axis current and the reference q-axis current are critical in determining one or more of the following items: (1) correct slip point, (2) minimum slip value, (3) maximum slip value, (4) minimum slip value as a function of rotor speed of the induction machine 55, and (5) maximum slip value as a function of rotor speed of the induction machine 55.

Figure 9:
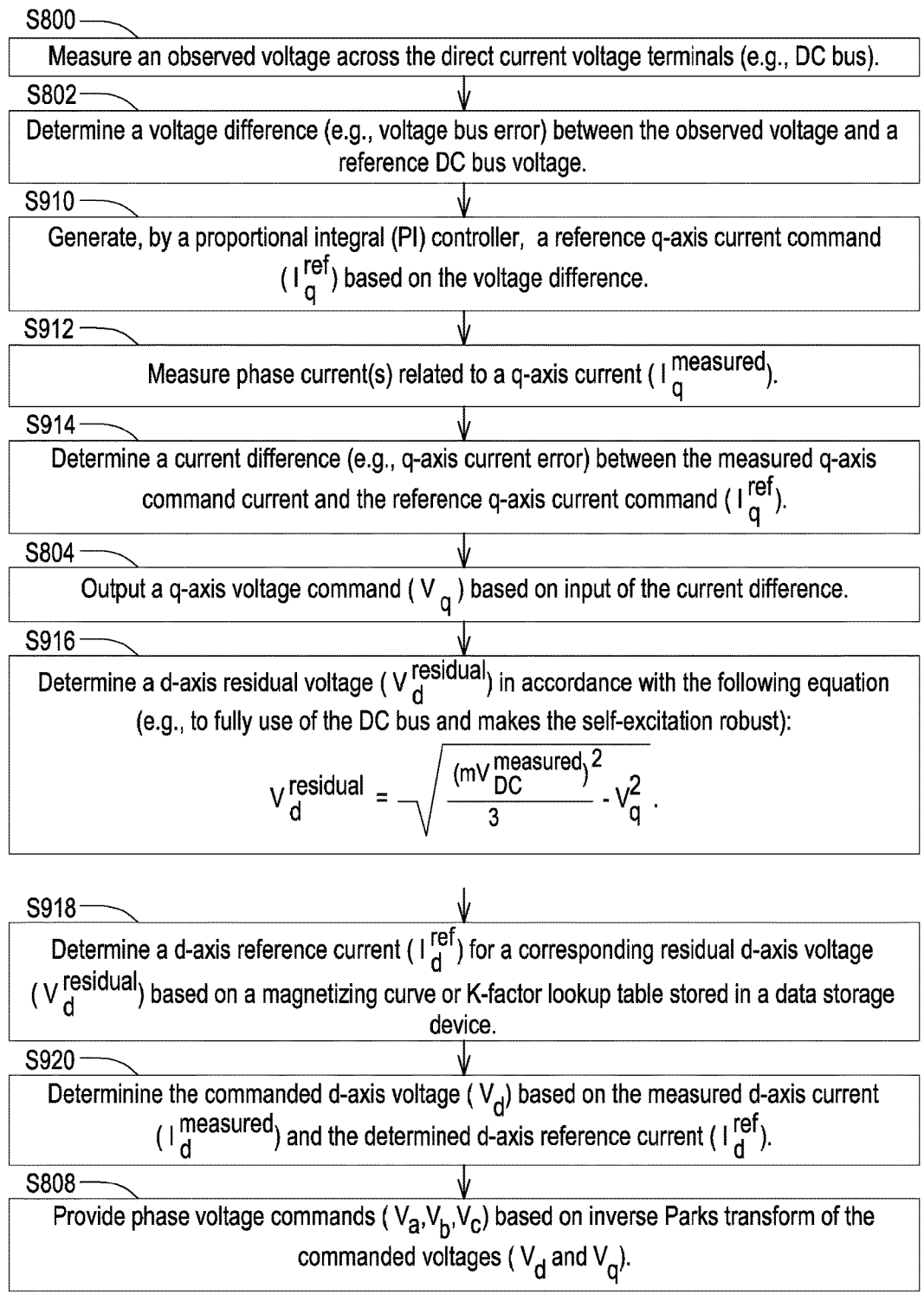
FIG. 9 is another embodiment of a flow chart of a method for a self-exciting of an induction machine.

FIG. 9 is another embodiment of a flow chart of a method for a self-exciting of an induction machine 55. The method of FIG. 9 begins in step S800. Like reference numbers in FIG. 8 and FIG. 9 indicate like steps, procedures or features.

In step S800, a voltage sensor 575 measures an observed voltage across the direct current voltage terminals (28, 30) (e.g., DC bus).

In step S802, a voltage difference module 104, a summer or a data processor 128 determines a voltage difference (e.g., voltage bus error) between the observed voltage and a reference DC bus voltage.

In step 910, a controller 106 or data processor 128 generates a reference q-axis current command ($I_q^{ref}$) based on the voltage difference. For example, a proportional integral (PI) controller as controller 106 generates a reference q-axis current command ($I_q^{ref}$) based on the voltage difference.

In step S912, a current sensor 577 measures a q-axis current ($I_q^{measured}$). A current sensor 577 can measure one or more phase currents that relate to a q-axis current ($I_q^{measured}$). In one embodiment, one or more current sensors 577 facilitate the provision of a measured q-axis current to the electronic data processing system 100. For example, one or more current sensors 577 measure current for each phase, such as $I_a$, $I_b$, and $I_c$, where the inputs of a Parks transformation module 615 is coupled to an output of each current sensor 577 such that the Parks transformation module 615 transforms the measured currents into a measured q-axis current, or into a measured q-axis current and a measured d-axis current. In step S914, a current difference module 108, a summer or a data processor 128 determines a current difference (e.g., q-axis current error) between the measured q-axis command current and the reference q-axis current command ($I_q^{ref}$).

In step S804, a first current regulator 110 outputs a q-axis voltage command ($V_q$) based on an input of the current difference, such as the current difference (e.g., q-axis current error) between the measured q-axis command current and the reference q-axis current command ($I_q^{ref}$). For example, the first current regulator 110 outputs a q-axis voltage command ($V_q$) based on an input of the current difference based on a proportional integral control compensator or similar transfer function, which may be represented as a separate block within the first current regulator 110. The first current regulator 110 outputs a q-axis voltage command (or its equivalent q-axis current command) to the inverse Parks transformation module 612. The inverse Parks transformation module 612 uses the q-axis voltage command, the d-axis voltage command, and measured rotor position (e.g., electrical rotor position, $\theta_e$, based on mechanical rotor position and slip angle velocity) to provide appropriate control signals (e.g., commanded q-axis voltage ($V_q$) for each phase) to the driver module 614.

In step S916, a data processor 128 determines a d-axis residual voltage ($V_d^{residual}$) in accordance with the following equation (to fully use of the DC bus and to facilitate robust, reliable self-excitation of the windings of the induction machine):

$$V_d^{residual} = \sqrt{\frac{(mV_{DC}^{measured})^2}{3} - V_q^2} \, ;$$

where $V_d^{residual}$ is the residual direct-axis current;

m is the modulation index (e.g., approximately 0.95);

$V_{DC}^{measured}$ is the measured voltage of or between the direct current terminals; and $V_q$ is the quadrature-axis voltage command.

Step S916 may be carried out in accordance with various techniques that may be applied alternately or cumulatively in the start-up stage, in the transitional excitation mode, or both.

Under a first technique, the data processor 128 or electronic data processing system 100 uses the d-axis residual voltage ($V_d^{residual}$) to inflate the reference d-axis current command ($I_d^{ref}$) above its normal value for the reference d-axis current command for the respective performance characteristics of the particular induction machine 55 or induction generator. In turn, the inflated reference d-axis current command ($I_d^{ref}$) causes a greater difference (e.g., error) between the measured d-axis current ($I_d^{measured}$) and the inflated d-axis reference current ($I_d^{ref}$) as input to the second current regulator 124 that outputs the commanded d-axis current consistent with ramping up the DC link voltage to a start-up direct current voltage or a target direct current voltage.

Under a second technique, during the start-up stage, after the start-up mode, or during the transitional excitation mode the electronic data processing system 100 or the data processor 128 selects the direct-axis voltage command to be equal to or greater than a threshold direct current link voltage (e.g., target start-up direct current voltage or target operational direct current voltage) of or between the direct current terminals. For example, during the start-up mode or during the transitional excitation mode the threshold direct current link voltage may be within a range of approximately thirty volts direct current to approximately one hundred and fifty volts direct current, where approximately means about, generally or a margin or tolerance of plus or minus ten percent. However, after the start-up mode or after the transitional excitation mode during the normal operational mode of the inverter, the electronic data processing system 100 and data processor 128 transitions to or uses normal voltage and modulation index control (e.g., for pulse width switching) of the inverter switches.

Under a third technique, the data processor 128 or electronic data processing system 100 supports setting or storing of a transition direct current voltage level or start-up voltage level (e.g., direct current link voltage) of the observed direct current voltage to transition between the start-up mode and the operational mode, or to transition from the transitional excitation mode to the operational mode. For instance, the transition direct current voltage level or start-up voltage level and the target direct current voltage may comprise a factory programmable, user-definable, or otherwise programmable value. The inverter begins at transitional excitation mode once the start-up voltage level of the direct current bus is reached. The inverter ends the transitional excitation mode or the self-excitation mode when the target direct current voltage of the direct current bus is achieved or once the optional hand-off mode is completed.

Under a fourth technique, the data processor 128 or electronic data processing system 100 determines the d-axis reference current ($I_d^{ref}$) for a corresponding residual d-axis voltage ($V_d^{residual}$) based on a magnetizing curve or K-factor lookup table stored in a data storage device 120. This d-axis reference current is determined by characterizing the induction machine 55 in the lab or field tests, by obtaining specifications from a manufacturer or designer of the induction machine 55, or by other empirical or statistical studies of a set of particular induction machines 55. An accurate magnetizing curve for a corresponding induction machine 55 can be critical for successful self-excitation starting from a very low start-up voltage on DC voltage terminals or DC bus.

In step S918, the data processor 128 or data processing system determines the d-axis reference current ($I_d^{ref}$) for a corresponding residual d-axis voltage ($V_d^{residual}$) based on a magnetizing curve or K-factor lookup table stored in a data storage device 120.

In step S920, a second current regulator 124 (e.g., complex vector current regulator) determines the commanded d-axis voltage ($V_d$) based on the measured d-axis current ($I_d^{measured}$) and the determined d-axis reference current ($I_d^{ref}$).

In step S808, a data processor 128 or an inverse Parks transformation module 612 provides phase voltage commands ($V_a, V_b, V_c$) based on inverse parks transform or a similar transformation of the commanded voltages ($V_d$ and $V_q$). For example, the data processor 128 or inverse Parks transformation module 612 may determine the Parks transformation or a similar transformation in accordance with the following equation of the rotor field orientation:

$$\theta_e = \theta_{rotor} - \int \omega_{slip} dt,$$

where $\theta_e$ is the electrical angular position of the rotor;

where $\theta_{rotor}$ is the mechanical angular position of the rotor;

and $\omega_{slip}$ is the angular slip velocity of the rotor.

The angular slip velocity of the rotor ($\omega_{slip}$) is the control variable. The controller 106 or data processor 128 commands the correct operation of the slip point of the angular slip velocity using d and q axes current control. In particular, the reference d-axis current and the reference q-axis current are critical in determining one or more of the following items: (1) correct slip point, (2) minimum slip value, (3) maximum slip value, (4) minimum slip value as a function of rotor speed of the induction machine 55, and (5) maximum slip value as a function of rotor speed of the induction machine 55.

In accordance with the system and method in this document, one or more power supplies (e.g., of compact or modest size, low or modest cost, and low or modest current output) associated with the driver of the inverter can provide sufficient initial energy to charge a capacitor in a start-up mode. Because the power supplies only require a modest current output to sufficiently trickle charge the capacitor during the start-up mode, the system and method are well suited for repurposing or leveraging ordinary or typical driver circuitry of the inverter to charge the capacitor. Further, the capacitor that is charged may be embodied as a typical or existing capacitor that is already used across the direct current bus for filtering (e.g., voltage transients) of the direct current signal of the inverter.

To facilitate the proper use of the stored energy in the capacitor across the terminals of the direct current bus, (e.g., in a transitional excitation mode) an electronic data processing system can control switches of the driver to control the power supplies of the driver to judiciously and efficiently deploy the energy stored in the capacitor for a successful transition to an operational mode from a start-up mode or start-up stage. The method and system facilitates efficient management of the electromagnetic flux and generated current induced in the induction machine after the start-up mode fully or adequately charges the capacitor to increase gradually the generated current that creates braking (generating) torque on a shaft that is rotated. For example, the electronic data processing system increases the induced current and voltage output of the induction machine in controlled incremental steps, in successive graduated steps, or in accordance with a continuous ramping process. In one embodiment, the data processing system sets the ramp-up rate of increase in electromagnetic flux and generated current or generated voltage in the induction machine to avoid discharging the capacitor in a manner that interferes with self-excitation of the electrical energy in the induction machine to achieve an operational mode at a target voltage output on the direct current bus. Accordingly, the induction machine is capable of producing electrical power which charges the capacitor, replaces the initial stored energy in the capacitor and increases the output voltage beyond the level attainable by the power supplies or driver circuit alone.

Having described the preferred embodiment, it will become apparent that various modifications can be made without departing from the scope of the invention as defined in the accompanying claims.

The following is claimed:

1. A method of controlling an inverter coupled to a generator, the method comprising:
    measuring an observed voltage across direct current voltage terminals;
    determining a voltage difference between the observed voltage and a reference DC bus voltage;
    outputting a quadrature-axis (q-axis) voltage command based on a current difference derived from the voltage difference;
    determining a commanded direct-axis (d-axis) voltage based on a measured d-axis current and a determined d-axis reference current derived from a mathematical relationship between d-axis residual voltage, the observed voltage and the commanded q-axis voltage in which the d-axis residual voltage is proportional to a function of the observed voltage and the commanded q-axis voltage; and
    providing phase voltage command based on inverse Parks transform of the commanded voltages.

2. The method according to claim 1 wherein outputting the q-axis voltage command further comprises:
    generating a reference q-axis current command ($I_q^{ref}$) based on the voltage difference difference between the observed voltage and the reference DC bus voltage;
    measuring a q-axis current ($I_q^{measured}$); and
    determining the current difference between the measured q-axis command current and the reference q-axis current command ($I_q^{ref}$).

3. The method according to claim 1 wherein the determining the commanded d-axis voltage ($V_d$) further comprises:
    determining a d-axis residual voltage ($V_d^{residual}$) in accordance with a following equation as the relationship:

$$V_d^{residual} = \sqrt{\frac{(mV_{DC}^{measured})^2}{3} - V_q^2}$$

where:
    m is a modulation index which is between zero and approximately 1,
    $V_{DC}^{measured}$ is the measured voltage of or between the direct current terminals, and
    $V_q$ is the quadrature-axis voltage command; and
    determining the dxzd-axis reference current ($I_q^{ref}$) for the corresponding residual d-axis voltage ($V_d^{residual}$) based on a magnetizing curve or K-factor lookup table stored in a data storage device.

4. The method according to claim 1 wherein the relationship adheres to a following equation:

$$V_d^{residual} = \sqrt{\frac{(mV_{DC}^{measured})^2}{3} - V_q^2}$$

where:
    m is a modulation index which is between zero and approximately 1,
    $V_{DC}^{measured}$ is the measured voltage of or between the direct current terminals, and
    Vq is the quadrature-axis voltage command.

5. The method according to claim 2 wherein the providing the phase voltage commands further comprises determining the parks transformation in accordance with a following equation of the rotor field orientation:

$$\theta_e = \theta_{rotor} + \int \omega_{slip} dt,$$

where $\theta_e$ is an electrical angular position of the rotor;
where $\theta_{rotor}$ is a mechanical angular position of the rotor; and $\omega_{slip}$ is an angular slip velocity of the rotor.

6. A method of controlling an inverter coupled to a generator, the method comprising:
    measuring an observed voltage across direct current voltage terminals;

determining a voltage difference between the observed voltage and a reference DC bus voltage;
generating, by a controller, a reference q-axis current command ($I_q^{ref}$) based on the voltage difference;
measuring a q-axis current ($I_q^{measured}$);
determining a current difference between the measured q-axis command current and the reference q-axis current command ($I_q^{ref}$);
outputting, by a current regulator, a q-axis voltage command ($V_q$) based on input of the current difference;
determining a d-axis residual voltage ($V_d^{residual}$) in accordance with a following equation:

$$V_d^{residual} = \sqrt{\frac{(mV_{DC}^{measured})^2}{3} - V_q^2},$$

where:
m is a modulation index,
$V_{DC}^{measured}$ is the measured voltage of or between the direct current terminals, and
$V_q$ is the quadrature-axis voltage command;
determining d-axis reference current ($I_d^{ref}$) for the corresponding residual d-axis voltage ($V_d^{residual}$) based on a magnetizing curve or K-factor lookup table stored in a data storage device;
determining, by a current regulator, the commanded d-axis voltage ($V_d$) based on a measured d-axis current ($I_d^{measured}$) and the determined d-axis reference current ($I_d^{ref}$); and
providing phase voltage commands ($V_a, V_b, V_c$) based on inverse parks transform of the commanded voltages ($V_d$ and $V_q$).

7. The method according to claim 6 wherein the providing the phase voltage commands further comprises determining the parks transformation in accordance with the following equation of the rotor field orientation:

$$\theta_e = \theta_{rotor} + \int \omega_{slip} dt,$$

where $\theta_e$ is an electrical angular position of the rotor;
where $\theta_{rotor}$ is a mechanical angular position of the rotor;
and $\omega_{slip}$ is an angular slip velocity of the rotor.

8. A system of controlling an inverter coupled to a generator, the system comprising:
a voltage sensor for measuring an observed voltage across direct current voltage terminals;
a voltage difference module for determining a voltage difference between the observed voltage and a reference DC bus voltage;
a first current regulator outputting a q-axis voltage command ($V_q$) based on a current difference derived from the voltage difference;
a second current regulator for determining a commanded d-axis voltage ($V_d$) based on a measured d-axis current ($I_d^{measured}$) and a determined d-axis reference current ($I_d^{ref}$) derived from a mathematical relationship between d-axis residual voltage ($V_d^{residual}$), the observed voltage ($V_{DC}^{measured}$) and the commanded q-axis voltage ($V_q$) in which the d-axis residual voltage is proportional to a function of the observed voltage ($V_{DC}^{measured}$) and the commanded q-axis voltage ($V_q$); and
an inverse Parks transformation module for providing phase voltage commands ($V_a, V_b, V_c$) based on inverse Parks transform of the commanded voltages ($V_d$ and $V_q$).

9. The system according to claim 8 further comprising:
a proportional integral controller for generating a reference q-axis current command ($I_q^{ref}$) based on the voltage difference;
a current sensor for measuring a q-axis current ($I_q^{measured}$); and
a current difference module determining the current difference between the measured q-axis current and the reference q-axis current command ($I_q^{ref}$).

10. The system according to claim 8 further comprising:
an inverter;
a pulse-width modulator coupled to the output of the inverse Parks transformation module and coupled to the inverter;
a residual voltage calculator for determining the d-axis residual voltage ($V_d^{residual}$) in accordance with a following equation (to fully use of the DC bus and makes the self-excitation robust) as the relationship:

$$V_d^{residual} = \sqrt{\frac{(mV_{DC}^{measured})^2}{3} - V_q^2} \quad V_d^{residual}$$

is the residual direct-axis voltage;
m is the modulation index,
$V_{DC}^{measured}$ is the measured voltage of or between the direct current terminals, and
$V_q$ is the quadrature-axis voltage command, and
a data processor to determine the d-axis reference current ($I_d^{ref}$) for a corresponding residual d-axis voltage ($V_d^{residual}$) based on a magnetizing curve or K-factor lookup table stored in a data storage device, the magnetizing curve or K-factor lookup table corresponding to a particular electric machine that the inverter controls.

11. The system according to claim 8 wherein the relationship adheres substantially to a following equation:

$$V_d^{residual} = \sqrt{\frac{(mV_{DC}^{measured})^2}{3} - V_q^2},$$

where:
m is a modulation index,
$V_{DC}^{measured}$ is the measured voltage of or between the direct current terminals, and
$V_q$ is the quadrature-axis voltage command.

12. The system according to claim 8 wherein the Parks transformation module uses a following equation of the rotor field orientation to provide phase voltage commands ($V_a, V_b, V_c$):

$$\theta_e = \theta_{rotor} + \int \omega_{slip} dt,$$

where $\theta_e$ is an electrical angular position of the rotor;
where $\theta_{rotor}$ is a mechanical angular position of the rotor;
and $\omega_{slip}$ an angular slip velocity of the rotor.

13. A system of controlling an inverter coupled to a generator, the system comprising:
a voltage sensor for measuring an observed voltage across direct current voltage terminals;
a voltage difference module for determining a voltage difference between the observed voltage and a reference DC bus voltage;
a controller for generating a reference q-axis current command ($I_q^{ref}$) based on the voltage difference;

a current sensor for measuring a q-axis current ($I_q^{measured}$);

a current difference module for determining a current difference between measured q-axis current and the reference q-axis current command ($I_q^{ref}$);

a first current regulator for outputting a q-axis voltage command ($V_q$) based on input of the current difference;

a data processor for determining a d-axis residual voltage ($V_d^{residual}$) in accordance with a following equation (to fully use of the DC bus and makes the self-excitation robust):

$$V_d^{residual} = \sqrt{\frac{(mV_{DC}^{measured})^2}{3} - V_q^2},$$

where:
$V_d^{residual}$ is the residual d-axis current,
m is the modulation index,
$V_{DC}^{measured}$ is the measured voltage of or between the direct current terminals, and
$V_q$ is the quadrature-axis voltage command;

the data processor determining d-axis reference current ($I_d^{ref}$) for a corresponding residual d-axis voltage ($V_d^{residual}$) based on a magnetizing curve or K-factor lookup table stored in a data storage device;

a second current regulator for determining the commanded d-axis voltage ($V_d$) based on the measured d-axis current ($I_d^{measured}$) and the determined d-axis reference current ($I_d^{ref}$); and an inverse Parks transformation module for providing phase voltage commands ($V_a, V_b, V_c$) based on inverse parks transform of the commanded voltages ($V_d$ and $V_q$).

14. The system according to claim 13 wherein the Parks transformation is adapted to determine the phase voltage commands in accordance with a following equation of the rotor field orientation:

$$\theta_e = \theta_{rotor} + \int \omega_{slip} dt,$$

where $\theta_e$ is an electrical angular position of the rotor;
where $\theta_{rotor}$ is a mechanical angular position of the rotor; and $\omega_{slip}$ is an angular slip velocity of the rotor.

* * * * *